United States Patent
De Muelenaere et al.

(10) Patent No.: US 9,679,179 B2
(45) Date of Patent: Jun. 13, 2017

(54) METHOD FOR PROCESSING INFORMATION FROM A HAND-HELD SCANNING DEVICE

(71) Applicants: Pierre De Muelenaere, Court-Saint-Etienne (BE); Michel Dauw, Diegem (BE); Patrick Verleysen, Wavre (BE); Rene Barbier, Andenne (BE)

(72) Inventors: Pierre De Muelenaere, Court-Saint-Etienne (BE); Michel Dauw, Diegem (BE); Patrick Verleysen, Wavre (BE); Rene Barbier, Andenne (BE)

(73) Assignee: I.R.I.S., Mont-Saint-Guibert (BE)

( * ) Notice: Subject to any disclaimer, the term of this patent is extended or adjusted under 35 U.S.C. 154(b) by 0 days.

(21) Appl. No.: 14/840,862

(22) Filed: Aug. 31, 2015

(65) Prior Publication Data

US 2017/0061182 A1    Mar. 2, 2017

(51) Int. Cl.
*G06K 7/10* (2006.01)
*G06K 9/00* (2006.01)

(52) U.S. Cl.
CPC ..... *G06K 7/10881* (2013.01); *G06K 9/00442* (2013.01)

(58) Field of Classification Search
CPC .............. G06K 7/10881; G06K 9/00442
See application file for complete search history.

(56) References Cited

U.S. PATENT DOCUMENTS

| | | | |
|---|---|---|---|
| 5,023,922 A | 6/1991 | Abramovitz et al. | |
| 5,083,218 A | 1/1992 | Takasu | |
| 5,974,204 A | 10/1999 | Lin | |
| 6,104,845 A | 8/2000 | Lipman | |
| 6,509,893 B1 | 1/2003 | Akhlagi | |
| 6,529,645 B2 | 3/2003 | Fahraeus | |
| 6,611,259 B1* | 8/2003 | Tillgren | B41J 2/315 178/18.01 |
| 6,965,703 B1 | 11/2005 | Regev | |
| 7,196,825 B2* | 3/2007 | Rydbeck | B41J 2/315 358/424 |
| 2002/0131636 A1* | 9/2002 | Hou | G06F 1/1626 382/181 |
| 2013/0194179 A1* | 8/2013 | Yoshida | G06F 3/014 345/156 |

FOREIGN PATENT DOCUMENTS

SE    WO 98/20446    5/1998

* cited by examiner

*Primary Examiner* — Christle I Marshall
(74) *Attorney, Agent, or Firm* — Jerold I. Schneider; Schneider Rothman Intellectual Property Law Group, PLLC

(57) ABSTRACT

A method implemented on a mobile device for selecting information on a paper document using a hand-held scanning device. The method provides an interface to the user, receives information from the hand-held pen scanning device connected to the mobile device and determines if the received information is valid information for the type of information to be selected. The invention further relates to using a remote computer for performing image processing and data extraction when more powerful resources are needed.

20 Claims, 22 Drawing Sheets a pen-input
to-digital co1
digital-to-an:

FIG. 11

METHOD FOR PROCESSING INFORMATION FROM A HAND-HELD SCANNING DEVICE

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION BY REFERENCE OF MATERIAL SUBMITTED ON A CD OR AS A .TXT FILE VIA EFS-WEB

Not applicable

STATEMENT REGARDING PRIOR DISCLOSURES BY THE INVENTOR OR A JOINT INVENTOR

Not applicable

FIELD OF THE INVENTION

The present invention relates to a method for selecting information on a physical document or object, and more particular for selecting and determining information using a hand-held scanning device. The present invention further relates to a method for entering information in an application implemented on a mobile device.

BACKGROUND

Optical character recognition (OCR) hand-held scanners are known. They convert the image of a printed text, barcode or picture into a machine-readable code. Often, the image acquired by the hand-held scanning device is transferred to the PC/Mac which then performs the following steps: process the image to improve the quality, OCR the text, and export the recognized text to an application. An example of an OCR hand-held scanner known in the art is a pen scanner. A pen scanning device is a scanning device shaped like a pen usually connected to a computer. The pen scanning device is operated by hand and allows to enter a line of text into a computer application by sliding the pen on the document.

The OCR hand-held scanners comprise a one dimensional optical sensor for acquiring image information which is managed by a processing unit and stored in a memory. For a hand-held scanner, the hand-held scanner is passed over a printed text by the user such that there is relative movement between the optical sensor and the printed text to be acquired. During such relative movement, a series of images are acquired in which each acquired image corresponds to a small portion of the printed text to be scanned. When the scanned image is to be reconstructed, a distorted image results from the combined acquired images.

Since a one dimensional sensor is used, the problem occurred how to calculate the instantaneous scanning speed which is needed to rebuild the two dimensional image. Solutions to correct this distortion in the scanned image are known in the art.

Some solutions have been based on mechanical structures such as small wheels being in contact with the paper and allowing to calculate the speed. U.S. Pat. No. 5,083,218 discloses a hand-held image reading apparatus in which a rubber roller moves over the surface of the image to determine the relative movement between the hand-held scanning device and the image being scanned or acquired.

In another solution disclosed in U.S. Pat. No. 5,023,922, a two-dimensional optical sensor is used for calculating the speed of the relative movement based on the time interval required for an image to transverse the sensor.

In still another solution, U.S. Pat. No. 6,965,703 discloses to correct the distortion caused by the variability of the instantaneous scanning speed by applying a compensation. This solution utilizes the character height and font ratio for each font in the text to obtain a local correction factor at each location in the text image. The local correction factor is subsequently used to correct the distorted image. Although, the above solutions provide, in many cases, more than reasonable results, the resulting OCR accuracy is, in a number of situations, still too low especially because the hand-held device is operated by hand. Since the hand-held scanning device is operated by hand, the user himself introduces various kinds of distortions in the scanned images which are not caused by changing the speed of the hand-held scanning device.

Further, paper documents are often scanned to have their information extracted and transferred to a data management software, wherein the relevant part of this information can be automatically handled. A known method to do that is to scan the full paper document, extract the information from the full paper document, then select the relevant information and transfer it to the data management software. This method is inefficient because the full document has to be scanned and information has to be extracted from the full document. Moreover, the selection of the relevant information can be difficult because the relevant information can be difficult to locate in the information about the full document.

OCR applications can be performed on mobile devices, but the mobile devices have typically not enough computing power to perform fast and accurate OCR. Moreover, mobile devices have typically not enough memory to perform OCR in many languages.

SUMMARY

It is an aim of the present invention to provide an efficient method for selecting information on a physical document or object.

This aim is achieved according to the invention with the method showing the technical characteristics of the first independent claim.

In a first aspect, the present invention provides a method implemented on a mobile device for selecting information on a physical document or object, the mobile device being connectable to a hand-held pen scanning device, the method comprising
providing an interface to the user comprising an indication of a type of information to be selected;
receiving information from the hand-held pen scanning device connected to the mobile device;
determining if the received information is valid information for the type of information to be selected; and identifying the received information as selected information if the received information is valid.

With this method, the user knows from the interface which information on the physical document or object he has to select. He can then pick the right information on the physical document or object with the hand-held pen scanning device. There is no need to scan the full physical document and to perform heavy data treatment to select the right information.

In an embodiment according to the invention, the step of determining if the received information is valid information comprises sending the received information to a connected remote computer for comparing the received information with a database of valid information;

receiving feedback information with respect to the received information from the remote computer wherein the feedback information is one of valid indicating that the received information is corresponding with valid information in the database or invalid indicating that the received information is not corresponding to valid information in the database.

In such a way, the database does not have to be present in a memory of the mobile device, but can be in a remote computer, for example in the cloud.

In an embodiment according to the invention, the step of determining if the received information is valid information comprises performing a validation check on the mobile device when the type of information is a first type of information and sending the received information to a remote computer for a validation check if the type of information is a second type of information.

This embodiment makes possible to validate simple, easy-to-validate, information in the mobile device, and validate remotely more complex-to-validate information, for example information wherein the validation requires a database.

Advantageously, the first type of information is information to be verified on the format of the information and wherein the second type of information is information to be verified on the content of the information. A verification on a format can be done easily by a mobile device, which may have limited computing power and memory, while a verification on a content, which typically requires more computing resources can be done remotely.

In an embodiment according to the invention, the connection between the mobile device and the pen scanning device is wireless. This helps the handling of the hand held pen scanning device.

In an embodiment according to the invention, the step of determining if the received information is valid information comprises applying a character identification process on the received information to become text information. A character identification makes possible to increase the threshold for the validation, i.e., to increase the chance that the validated information is actual valid information.

Advantageously, the step of determining if the received information is valid information comprises pre-processing the received information to become a straight line image. The image coming from a scanning by a hand held scanning device may have several distortions due to the manual handling of the scanner, and a pre-processing can strongly improve the accuracy of the character identification.

In an embodiment according to the invention, the interface comprises fields of a first type and a second type, and wherein the step of determining if the received information is valid information comprises performing a validation check on the mobile device when the field is a field of the first type and sending the received information to a remote computer for a validation check if the field is a field of the second type.

The validation can be more or less complex according to the type of information that has to be validated. The type of information that has to be validated is known from the field on the interface, with some fields that require a less complex validation that is preferably performed on the mobile device, and some fields that require a more complex validation that is preferably performed remotely.

It is another aim of the present invention to provide a method to perform an appropriate OCR on an image captured by a hand-held scanning device connectable to a mobile device.

This aim is achieved according to the invention with a method comprising the steps of the second independent claim.

In a second aspect, the present invention provides a method for determining information in an application implemented on a mobile device using a hand-held scanning device for capturing information, wherein the hand-held scanning device is connectable to the mobile device and the mobile device is connectable to a remote computer, the method comprising receiving an acquired image from the hand-held scanning device on the mobile device, pre-processing the acquired image on the mobile device to become a pre-processed image;

applying a character recognition process on the pre-processed image to identify characters in the pre-processed image, wherein in a first predetermined situation a first character recognition process implemented on the mobile device is applied to the pre-processed image and in a second predetermined situation a second character recognition process implemented on a remote computer is applied to the pre-processed image.

This method is very flexible since the character recognition can be performed locally on the mobile device, or remotely on the remote computer, depending on what is the most suitable according to the actual situation.

In an embodiment of the invention, the hand-held scanning device is a hand-held pen scanning device.

In an embodiment of the invention, the pre-processing step comprises correcting distortion in the acquired image. The image coming from a scanning by a hand held pen scanning device is expected to have more distortions than an image coming from a desktop scanner, due to the manual handling of the scanner. Therefore, a pre-processing can strongly improve the accuracy of the character identification.

Advantageously, the step of correcting distortion comprises correcting distortion due to instantaneous change of speed of the hand-held pen scanning device with respect to the scanned object and correcting distortion due to instantaneous change of scanning direction with respect to the scanned object.

In an embodiment of the invention, the hand-held scanning device is wirelessly connectable to the mobile device. This improves the handling of the hand-held scanning device.

In an embodiment of the invention, the application is an invoice processing application comprising fields, and a first type of fields activates the first predetermined situation for applying the first character recognition process and a second type of fields activates the second predetermined situation for applying the second character recognition process.

The character recognition process can be more or less complex according to the type of information where the characters have to be recognized. The type of information where the characters have to be recognized is known from the fields in the interface, with some fields that require a less complex recognition that is preferably performed on the mobile device, and some fields that require a more complex recognition that is preferably performed remotely.

In an embodiment of the invention, a first language activates the first predetermined situation for applying the first character recognition process and a second language activates the second predetermined situation for applying the second character recognition process. Character recognition in some languages can be installed on the mobile device and character recognition in other languages can be installed on the remote computer, in order to obtain a quick recognition for the languages installed on the mobile device and a high choice of languages in the languages installed on the remote computer.

In an embodiment of the invention, a first accuracy parameter activates the first predetermined situation for applying the first character recognition process and a second accuracy parameter activates the second predetermined situation for applying the second character recognition process. Because of the high computing resources of the remote computer, the remote computer can perform more accurate character recognition than the mobile device. A first accuracy parameters indicating a low accuracy can lead to a lower-accuracy character recognition, on the mobile device, while a second accuracy parameters indicating a high accuracy can lead to a higher-accuracy character recognition, on the remote computer.

It is another aim of the present invention to provide an efficient method for entering information.

This aim is achieved according to the invention with a method for entering information comprising the steps of the third independent claim.

In a third aspect, the present invention provides method for entering information in an application implemented on a mobile device using a mobile scanning device for capturing the information, wherein the mobile scanning device is connected to the mobile device and the mobile device is connected to a remote computer, the method comprising receiving an image from the mobile scanning device on the mobile device, pre-processing the image on the mobile device to become a pre-processed image;
sending information based on the pre-processed image to a remote computer;
receiving classified text information from the remote computer to use in the application on the mobile device.

Advantageously, pre-processing is performed on the mobile device and information is sent to the remote computer for more powerful computing.

In embodiments of the invention, the method comprises the step of applying a character recognition process on the pre-processed image on the mobile device and the information based on the pre-processed image is text information resulting from the character recognition process.

Advantageously, the step of applying a character recognition process on the pre-processed image is performed on the mobile device and the more complex resources requiring classification of the identified information in a data extraction process is performed on the remote computer.

In an embodiment of the invention, the hand-held scanning device is a hand-held pen scanning device wirelessly connected with the mobile device.

In an embodiment of the invention, the application is an invoice processing application containing fields to be completed with classified text information, and wherein the classified text information is one of VAT number, company name, or company address.

BRIEF DESCRIPTION OF THE DRAWINGS

The invention will be further elucidated by means of the following description and the appended figures.

FIG. 11 illustrates a connection between characters in two lines; and

DETAILED DESCRIPTION OF THE DRAWINGS

Figure 1:
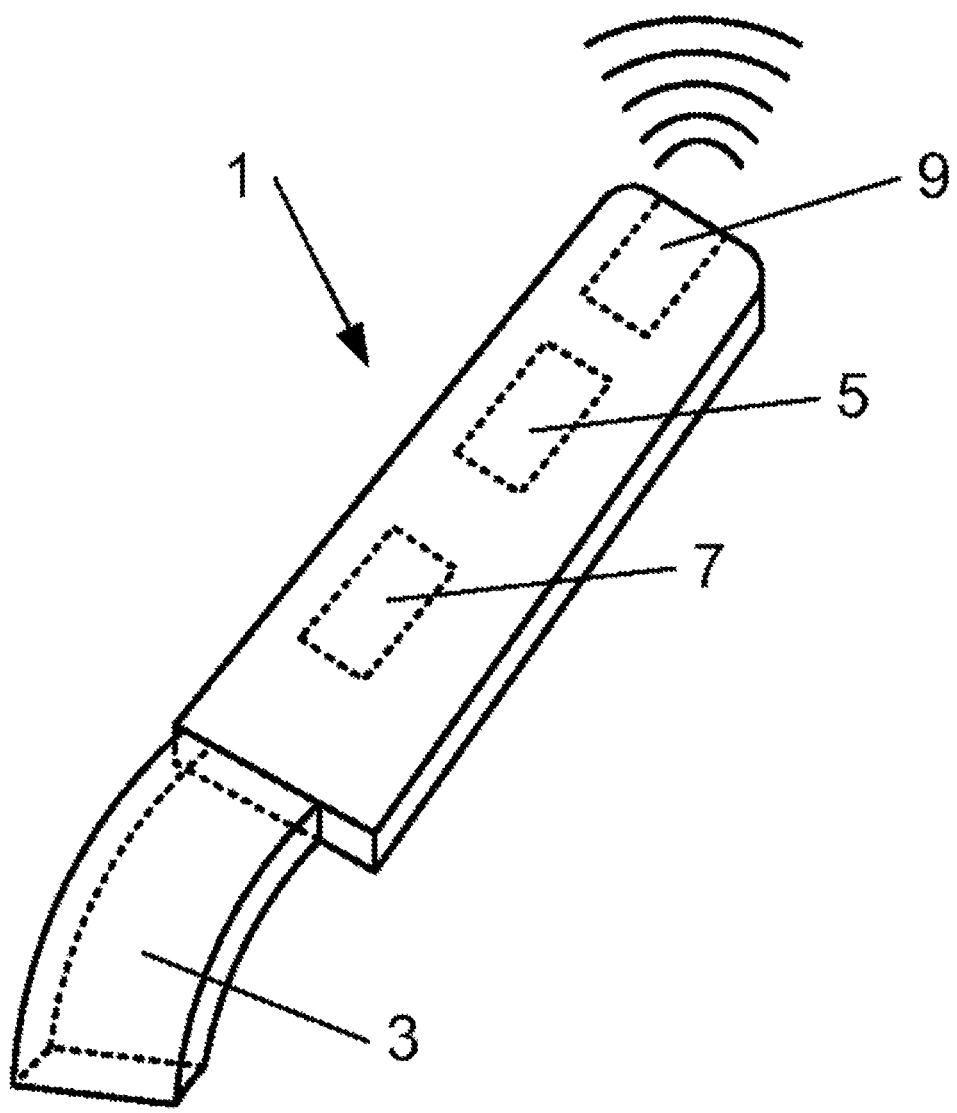
FIG. 1 illustrates a hand-held scanning device.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

The terms "connected component" or "CC" as used herein refer to a set of components (e.g. black or white pixels) that fulfils the following two conditions. The first condition is that each component of the connected component has the same value (e.g. black or white). The second condition is that each component of the connected component is connected to each of the component of the connected component by a path made of components which belong to the connected component. The connected component is not included in a larger set of components that fulfils the first and second conditions, i.e. is not included in a larger connected component. The description of a connected component may include a list of triplets whereby there is one triplet per column.

FIG. 1 illustrates a hand-held scanning device 1. The hand-held scanning device has an optical sensor 3 for acquiring an image when the hand-held scanning device is moved over a printed text to be scanned or acquired. This results in relative movement between the optical sensor 3 and the image being scanned or acquired. Alternatively, relative movement between the optical sensor and the printed text may be provided by moving the printed text with respect to the optical sensor. The hand-held scanning device 1 may have a processor 5 and an associated storage element 7. A program stored on the storage element 7 may be executed by the processor 5. The hand-held scanning device 1 may further have a wireless communication module 9. By having a wireless communication module, the hand-held scanning device can wirelessly send to and receive data from any electronic device which is able to communicate via the wireless communication module 9. For example, the hand-held scanning device 1 may be wirelessly connected to a tablet, smartphone, portable computer, personal computer, etc.

Figure 2A:
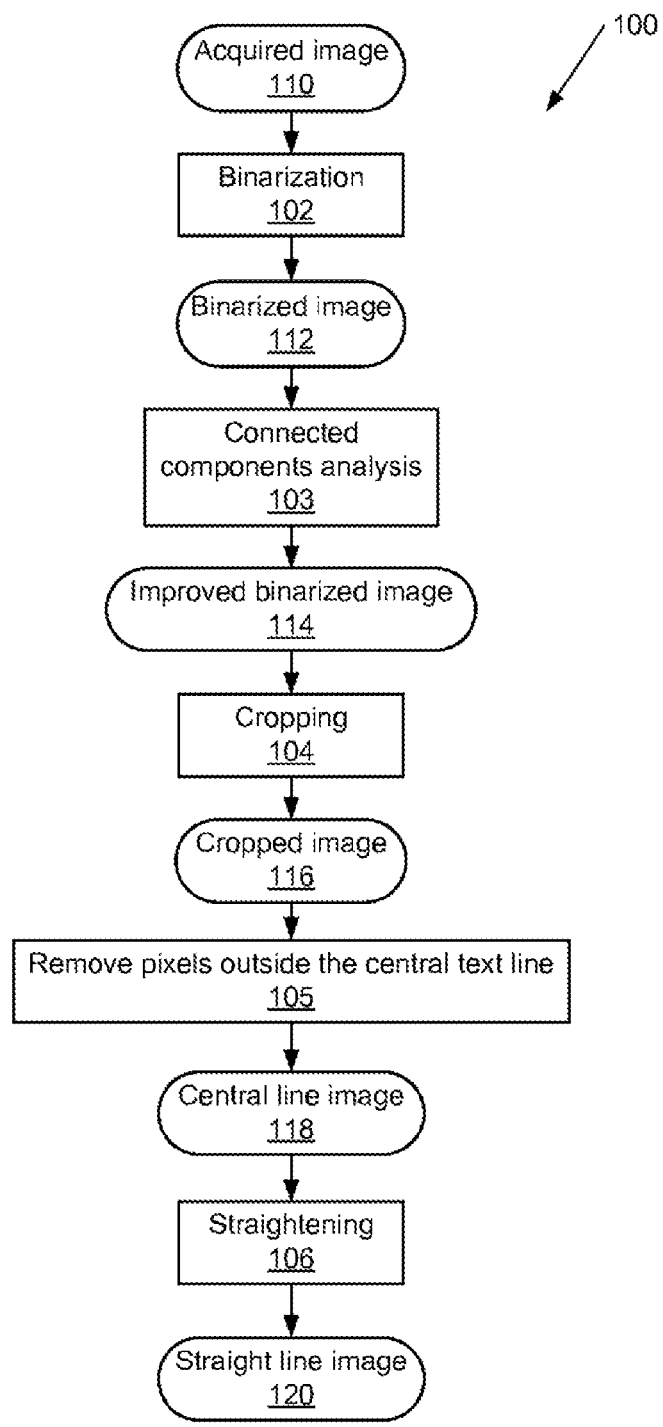
FIG. 2a illustrates a process flow for correcting an image acquired by the device of FIG. 1.

FIG. 2a illustrates a process flow 100 for correction of an image acquired by a hand-held scanning device 1. When a hand-held scanning device 1 moves over a printed text with multiple lines of text, symbols and images, the optical sensor 3 not only acquires the desired text line, hereinafter referred to as a central text line, but also parts of one or both neighbouring text lines. The acquired image 110 may be grayscale or colour. This acquired image 110 is the input for the process flow 100.

At step 102, image binarization is performed to create a binarized image 112. Image binarization may include converting pixel values of the acquired image 110 to either logical one (1) or logical zero (0). These values may be represented by a single bit or by more than one bit, for example, as 8-bit unsigned integers. The pixels of the acquired image 110 may be, grayscale pixels, colour pixels or pixels represented in any other suitable form. The pixel values may be represented by respectively black colour (logical 1) or white colour (logical 0).

In one embodiment, binarization may be performed using any known technique that may broadly be classified into global approaches, region-based approaches, local approaches, hybrid approaches, or any variations thereof. In one example implementation, the image binarization is performed using Sauvola binarization. In this technique, binarization is performed on the basis of small image patches. Upon analysing statistics of the local image patch, a binarization threshold is determined using the following formula:

$$T_{th} = m * \left[1 + k\left(\frac{s}{R} - 1\right)\right] \qquad [1]$$

where, m and s are local mean and standard deviation, respectively, R is the maximum value of the standard deviation; and k is the parameter controlling the threshold value. The parameter k may be chosen depending upon the document image. In one embodiment, k may be set manually. In another embodiment, the parameter k may be set automatically depending upon text characteristics of the document image.

At step 103, further image pre-processing may be performed on the binarized image 112. The further image pre-processing may require the erasure of very long and thin horizontal black connected components. The further image pre-processing may also include despeckling, which is the erasure of small dots. The result of this step 103 is an improved binarized image 114.

At step 104, the binarized image 112 (or the improved binarized image 114 if available) may be cropped to remove left and right white columns (if any). The result is a cropped image 116.

At step 105, any black pixels outside the central text line may be removed from the cropped image 116. The determination of the central text line to create as output a central text line image 118 is described in more detail below.

At step 106, the central text line in the central text line image 118 is corrected to a straight line of characters. The creation of a straight line image 120 from a wavy line is described in more detail below.

Figure 3:
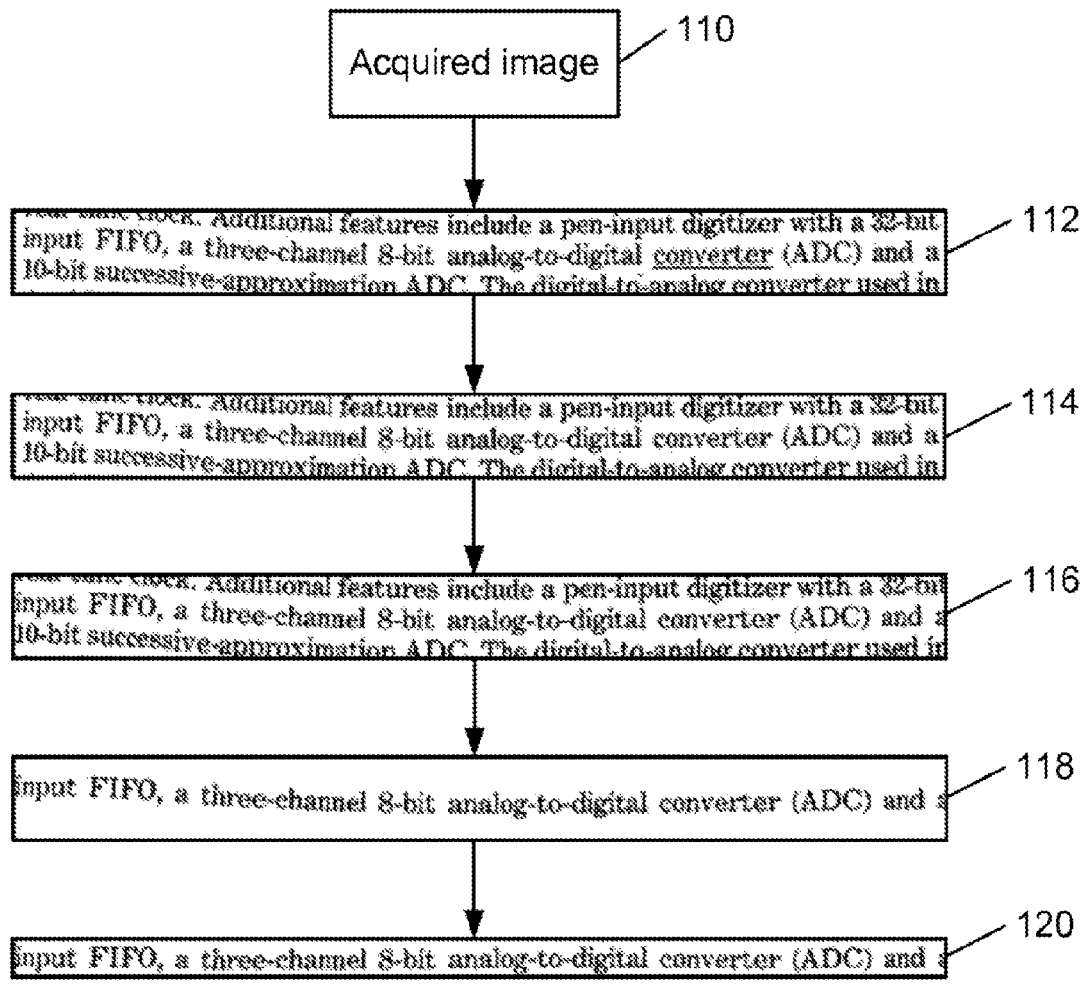
FIG. 3 illustrates an example of the process flow to provide an output image.

Referring now to FIG. 3, an example for the process flow 100 described above with respect to FIG. 2a is shown. Acquired image 110 is binarized to binarized image 112. Binarized image 112 is optionally improved by removing long horizontal black connected components which results in the improved binarized image 114. The improved binarized image 114 is subsequently cropped to become the cropped image 116. From the cropped image 116, the black components or pixels outside the central text line are removed or replaced by white components to form the central text line image 118. For the central text line image 118, the central text line is straightened to become a straightened central text line and the straightened central text line image 120 is formed.

Figure 2B:
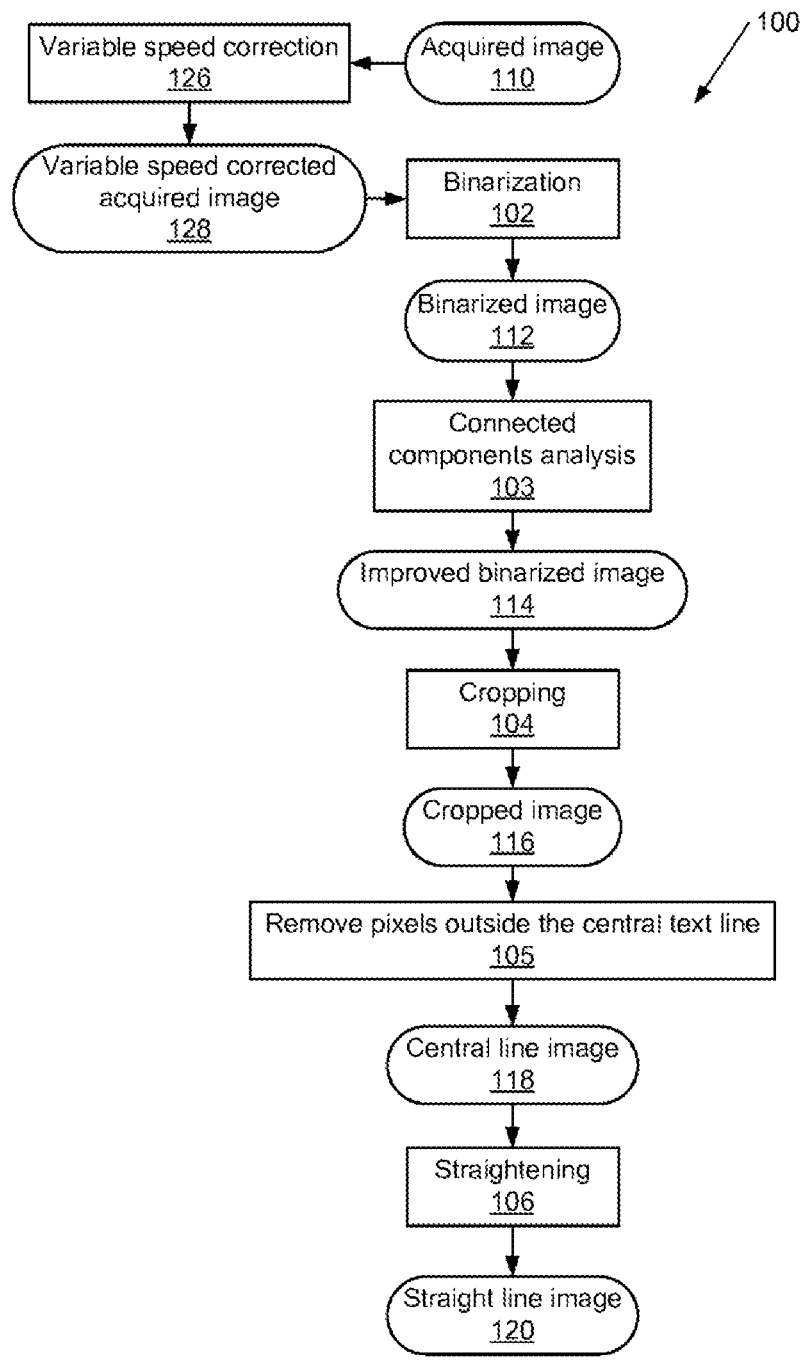
FIG. 2b illustrates the process flow of FIG. 2a combined with variable speed correction before binarization.
Figure 2C:
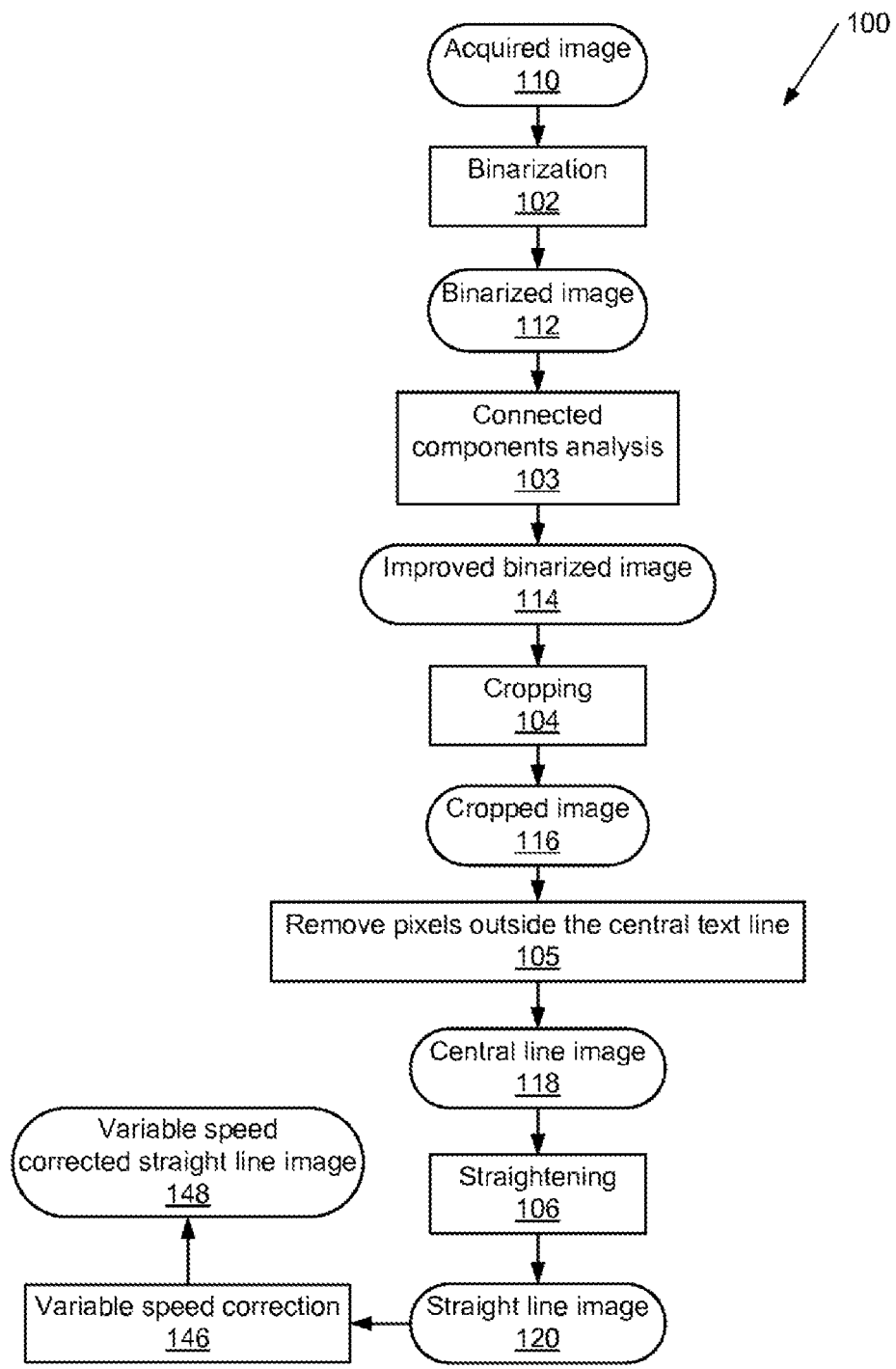
FIG. 2c illustrates the process flow of FIG. 2a combined with variable speed correction at the end of the correction process.

Process flow 100 (FIG. 2a) may have a step to correct distortion arising from the variable instantaneous speed of the hand-held scanning device with respect to the image being scanned or acquired. The variable speed correction 126 can be done at the beginning of the process flow of FIG. 2a, i.e. before binarization. This is illustrated in FIG. 2b. The output is a variable speed corrected acquired image 128 which is now the input for the binarization at step 102. Alternatively, the variable speed correction 146 can be performed at the end of the process flow of FIG. 2a, i.e. after the straight line image is created and thus with the straight line image as input for the correction of the speed correction step. The output is a variable speed corrected straight line image 148. This is illustrated in FIG. 2c. Correction of distortions coming from variable instantaneous speed are known in the art and all known variable speed correction methods can be combined with the present invention. Depending on the type of handheld scanning device, the correction of instantaneous scanning speed is made before binarization (see FIG. 2b) or as a last image pre-processing step (see FIG. 2c).

Testing learned that combining the correction as described in 2A with the instantaneous speed correction described in U.S. Pat. No. 6,965,703 wherein the instantaneous speed correction is executed at the end as illustrated in FIG. 2c provides a resulting image which delivers very accurate results in further character recognition processes. For a description of the speed correction method of U.S. Pat. No. 6,965,703, we refer to published document U.S. Pat. No. 6,965,703 of which we integrate the content by reference.

Figure 4:
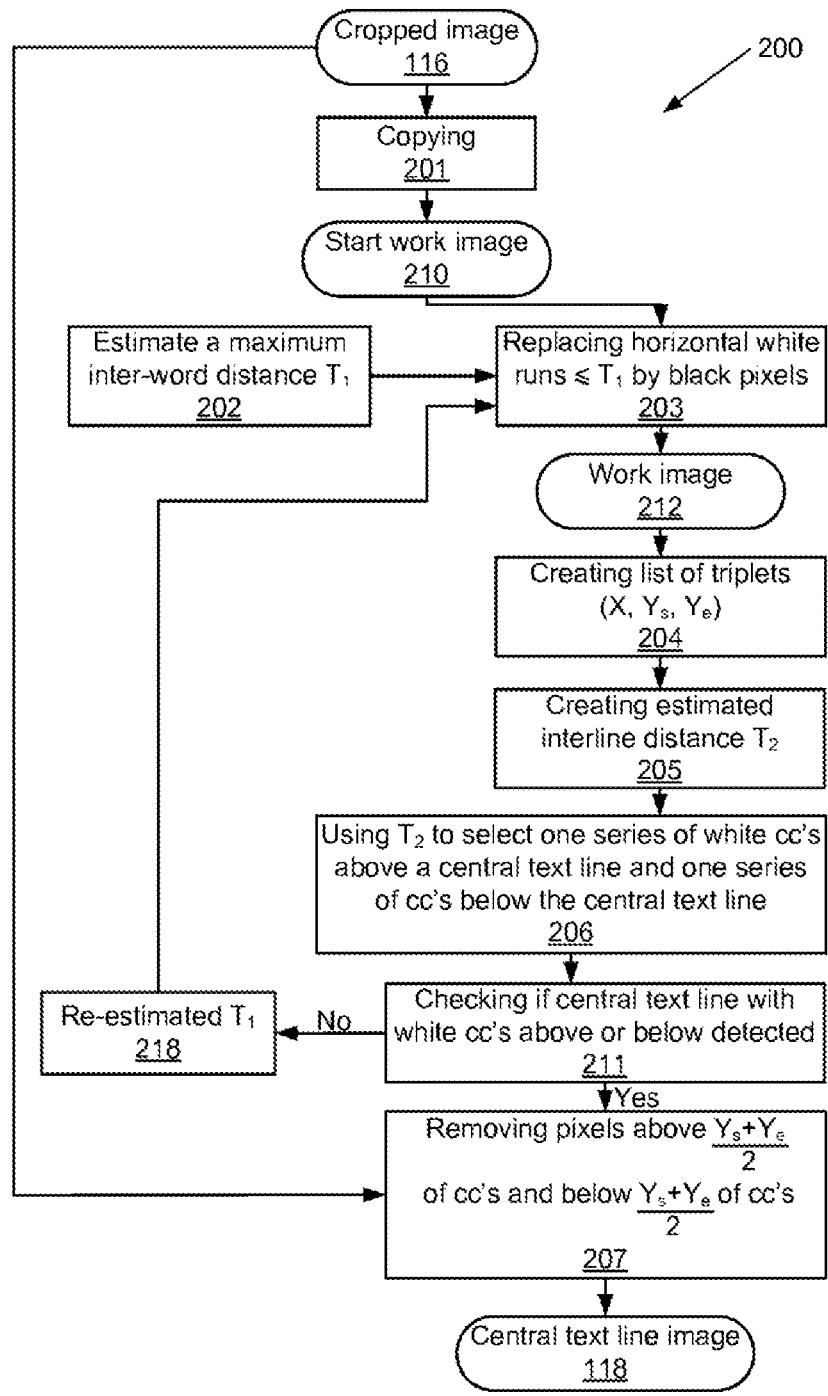
FIG. 4 illustrates a process flow for removing pixels outside a central text line.

FIG. 4 illustrates a process flow 200 corresponding to step 105 in process flow 100. In this process flow, black pixels (or any other type of predetermined components in the binarized image) outside the central line are removed.

At step 201, a start work image 210 may be created by copying the cropped image.

At step 202, a maximum inter-word distance T1 is estimated in the binarized image. This is discussed in more detail below.

At step 203, any horizontal white runs smaller or equal to the maximum inter-word distance T1 in the start work image 210 are set to black. The result of step 203 is a work image 212.

At step 204, the work image 212 is used to build a list of white connected components, each white connected component being described by a list of triplets (X, Ys, Ye) wherein X indicates the column X, Ys the start of the connected component in column X and Ye the end of the connected component in column X. The triplets (X, Ys, Ye) of each connected component are subsequently stored in a global list for all triplets of all CCs in the work image 212, the triplets being ordered from left to right and from top to bottom.

At step 205, an inter-line distance T2 is estimated by using the global list of triplets created in previous step.

At step 206, the estimated inter-line distance T2 is used to select one series of white connected components above a central text line and one series of white connected components below the central text line. This will be described in more detail below.

After step 206, at step 211, the system may check if a series of white connected components above and a series of white connected components below a central text line are detected. If this condition is not met ("no"), the maximum inter-word distance T1 is re-estimated in step 218, e.g. a larger maximum inter-word distance T1 value can be taken. If this condition is met ("yes"), the process flow moves to step 207.

At step 207, for each column corresponding to each triplet of the series of white connected components above the determined central line, black pixels above (Ys+Ye)/2 are changed to white, and for each column corresponding to each triplet of the series of white connected components below the determined line, black pixels below (Ys+Ye)/2 are changed to white. The resulting image is an image with only the determined central line in black pixels, called the central text line image 118.

Figure 5:
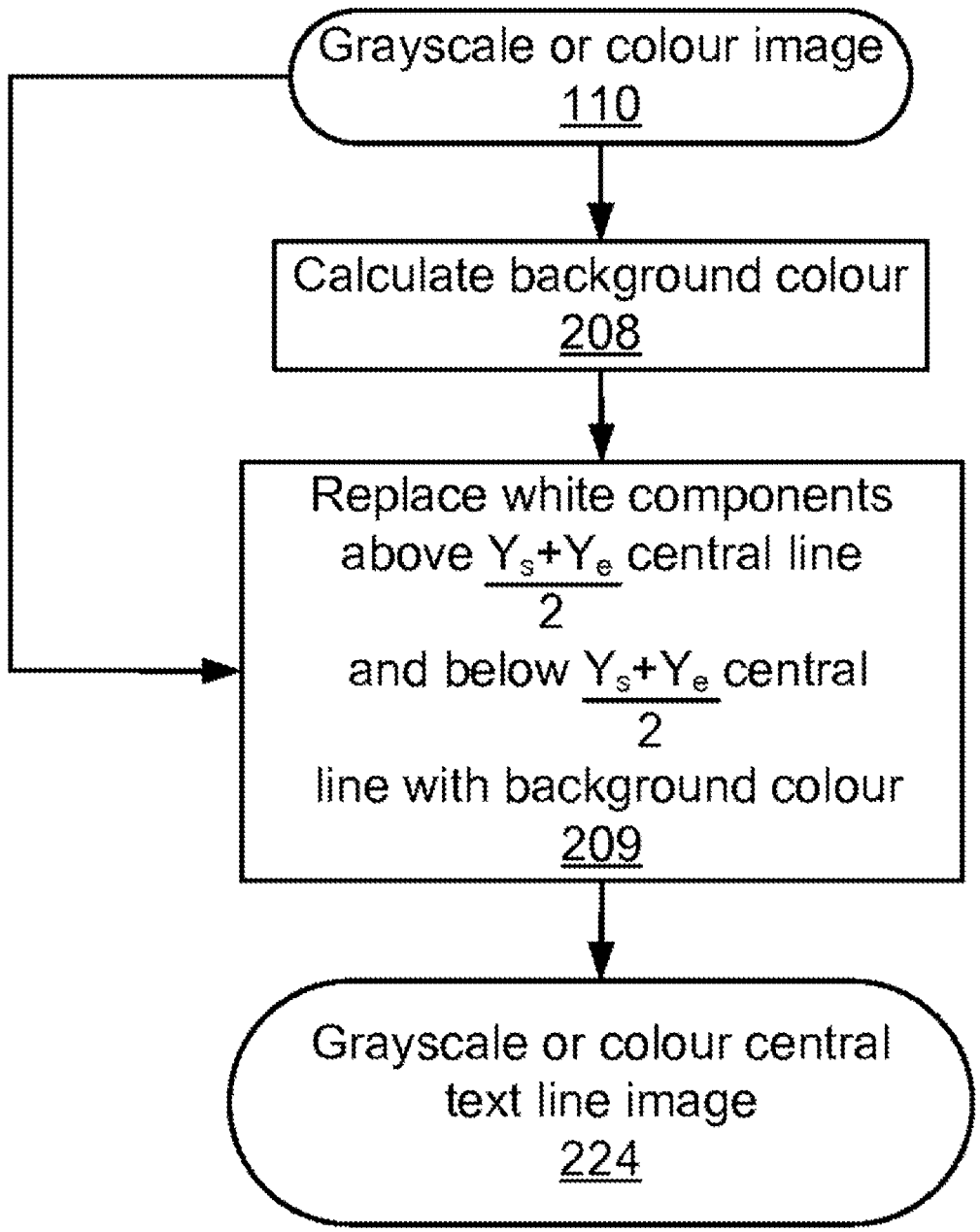
FIG. 5 illustrates a process flow for adjusting for background colour.

Optionally, the system may include steps 208 and 209 as illustrated in FIG. 5.

At step 208, a background colour is calculated by determining, in the scanned or acquired image 110, the components corresponding to white components in the binarized image 112. The calculated background colour is, for example, the average of all components in the acquired image 110 corresponding to white components in the binarized image 112.

At step 209, the components in the acquired image 110 above the determined central line and above (Ys+Ye)/2 are replaced by the calculated background colour of step 208, and the components in the acquired image 110 below the determined central line and below (Ys+Ye)/2 are replaced by the calculated background colour. The result is a grayscale or colour central text line image 224 on which the central line is isolated. By doing so, the grayscale or colour central text line image 224 can be used to correct the straightness of the central text line. If, however, step 208 and step 209 are not performed, the straightness of the central line is corrected on the (binarized) central text line image 118 (as described above with reference to FIG. 2a).

Figure 6:
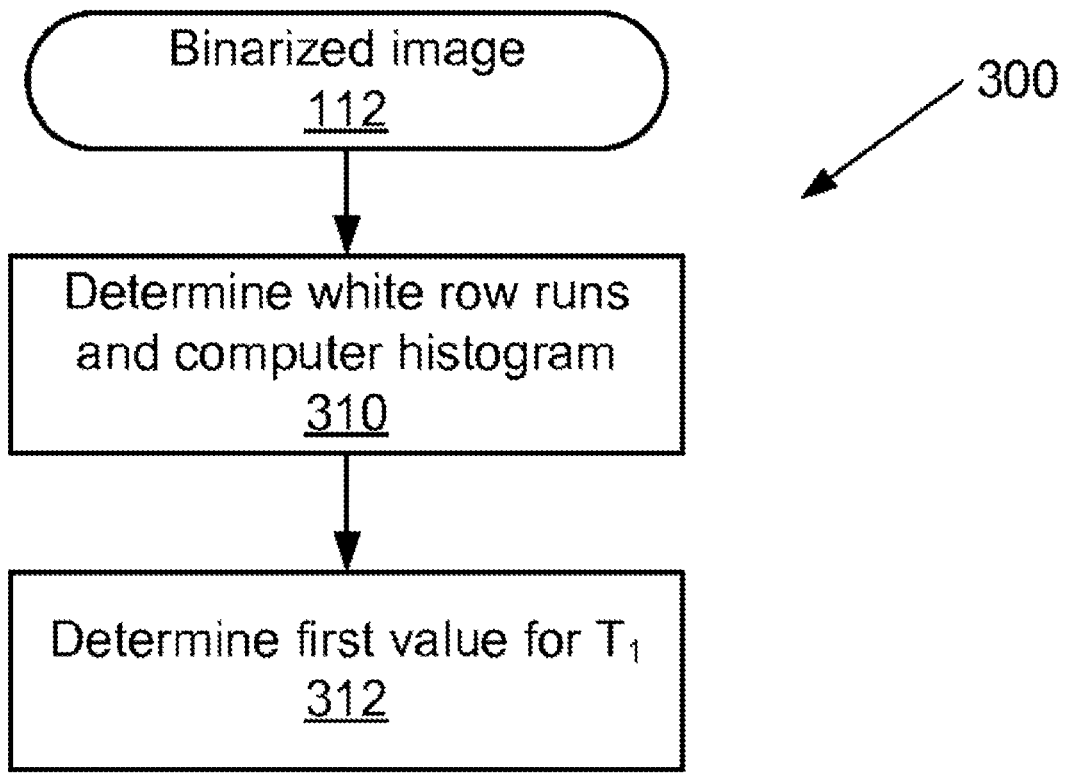
FIG. 6 illustrates a process flow for determining maximum inter-word distance.

FIG. 6 illustrates a process flow 300 to determine a first estimated value for the maximum inter-word distance T1 used in step 202 of process flow 200. At step 310, in the cropped image 116, all white row runs are determined and a histogram of their lengths is calculated.

At step 312, the histogram is used to determine a first estimate for the maximum inter-word distance T1 for use in step 202 of process flow 200 (FIG. 4).

Figure 7:
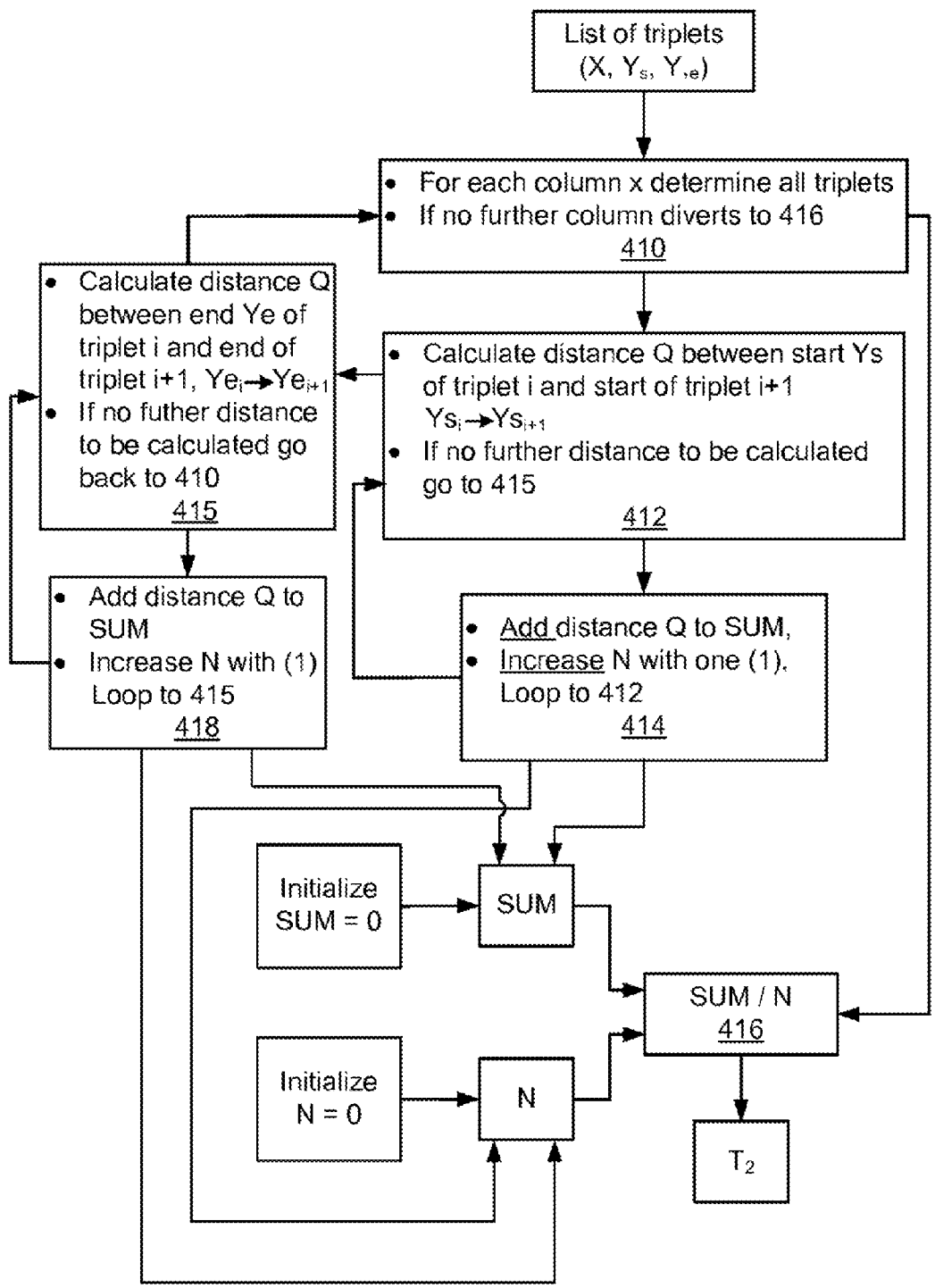
FIG. 7 illustrates a process flow for estimating an inter-line distance.

Referring to FIG. 7, a process flow 400 is illustrated which corresponds to step 205 in process flow 200 (FIG. 4). In this process flow 400, a first value for the inter-line distance T2 is determined. As described above, at step 204 a list of triplets, ordered from left to right and top to bottom, is created. For each column, at step 410, the triplets of the column are determined in the list. These are the triplets with the same value for X. If no other columns exist, the process flow moves to step 416 as will be described in more detail below.

At step 412, for each column X, the distance Q is determined between subsequent starts of triplets Ysi and Ysi+1.

At step 414, for each determined distance Q, this distance Q is added to the SUM parameter and the increment parameter N is increased by 1. After increasing the N parameter there is a loop back to step 412. At 412 if no further distances between subsequent starts of triplets are to be calculated, the process flow moves to step 415 and the distance Q between subsequent ends of triplets Yei and Yei+1 is determined. At step 418, for each determined distance Q, this distance is also added to the SUM parameter and the increment parameter N is increased by 1. Step 418 ends by looping back to step 415. At 415, if no further distances Q between subsequent ends of triplets are to be calculated, the process flow moves back to step 410 and a subsequent column X+1 will be processed. If no further column, the process flow moves to step 416.

At step 416, the SUM parameter is divided by the increment parameter N. The resulting value is a first estimate for the inter-line distance T2.

Figure 8A:
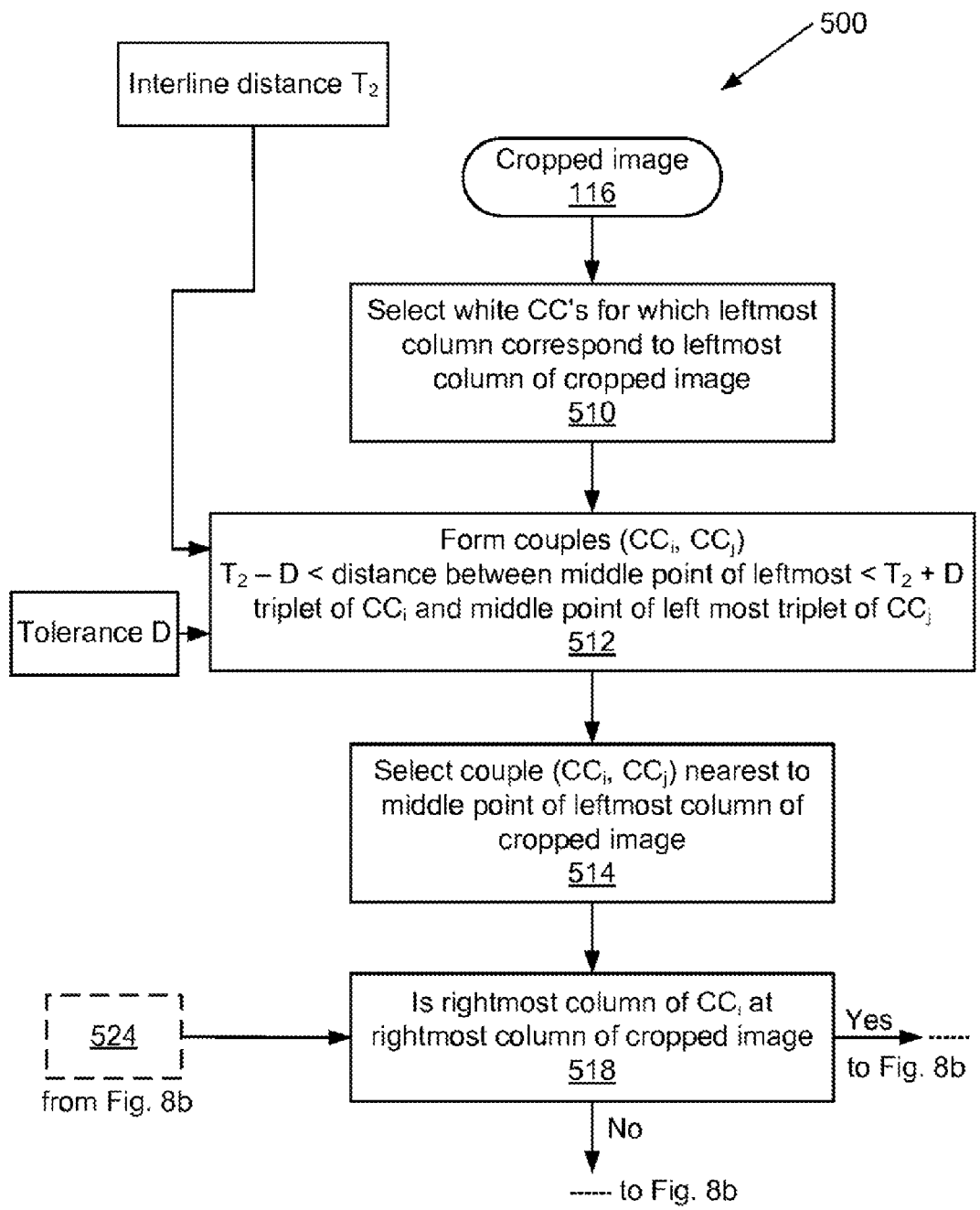
FIGS. 8a and 8b together illustrate a process flow for determining a central text line.
Figure 8B:
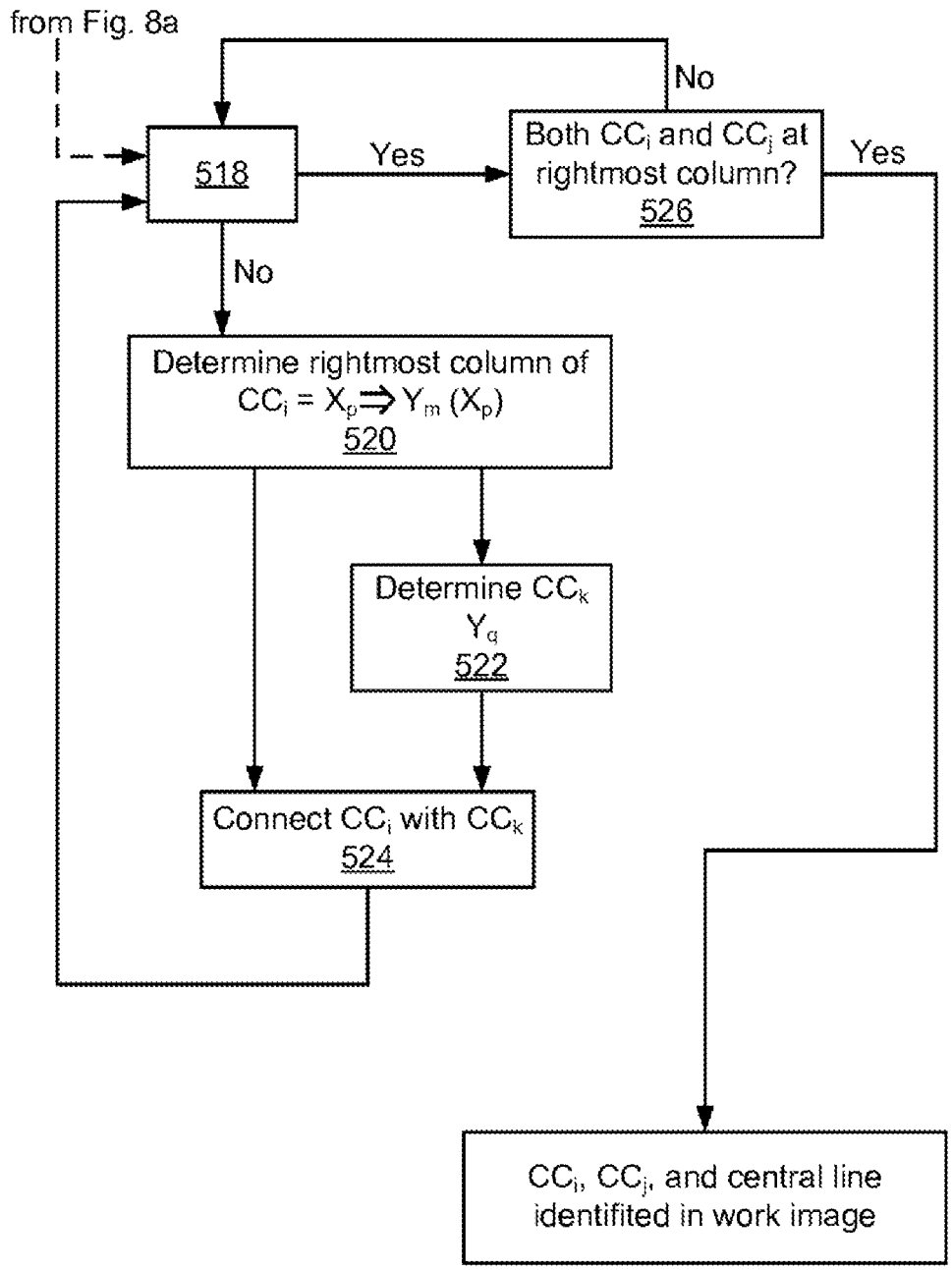

FIGS. 8a and 8b illustrate a process flow 500 corresponding to step 206 in process flow 200 (FIG. 4). In this process flow, the estimated inter-line distance T2 is used to determine two series of white connected components and a central line, in which one series of white connected components is above and one series of white connected components is below the determined central text line.

At step 510, white connected components CCn are selected for which the left side corresponds to the left side of the cropped binarized image.

At step 512, from the selection of white connected components CCn, couples [CCi, CCj] are formed where the couples fulfil the following conditions:
CCi is above CCj; and
the distance between the middle point of leftmost triplet of CCj and the middle point of the leftmost triplet of CCi is between (T2−D) and (T2+D) where D is a tolerance factor and T2 the estimated inter-line distance from step 205 (FIG. 4).

Figure 9:
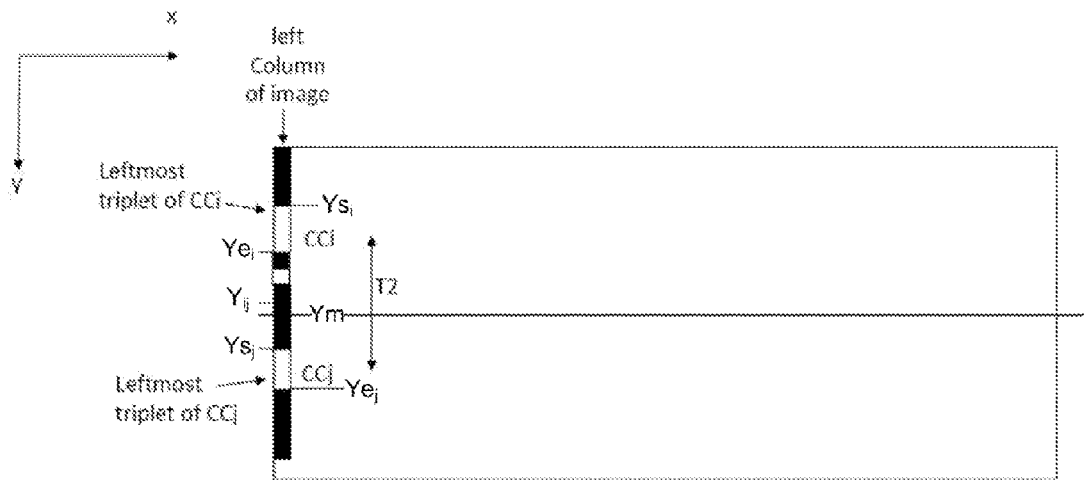
FIG. 9 illustrates a comparison step in the process flow of FIGS. 8a and 8b.

At step 514, for each couple [CCi, CCj] formed at step 512, a middle point Yij is calculated as the middle between the end Yei of the leftmost triplet of CCi and the start Ysj of the leftmost triplet of CCj. This is illustrated in FIG. 9. Further, the middle point Ym of the leftmost column of the cropped image is determined. Subsequently, the couple [CCi, CCj] is selected for which Yij is nearest to Ym: selected couple [CCi, CCj].

At step 518, it is verified if the rightmost column of the CCi is at the rightmost column of the cropped image. The outcome of step 518 can be yes or no as illustrated at the beginning of FIG. 8b.

If the outcome of step 518 is no, at step 520, the column position of the rightmost column of the CCi in the cropped image is determined. This column is indicated column Xp in FIG. 10. Further, the middle point Ym(Xp) of the triplet of CCi for column Xp is determined.

At step 522, the system identifies white connected components CCk for which the leftmost triplet overlaps a row of components through the middle point Ym(Xp). If more than one is found, connected components CCk for which the leftmost triplet is at a column Xq closest to column Xp is selected. Xq and CCk are illustrated on FIG. 10.

Figure 10:
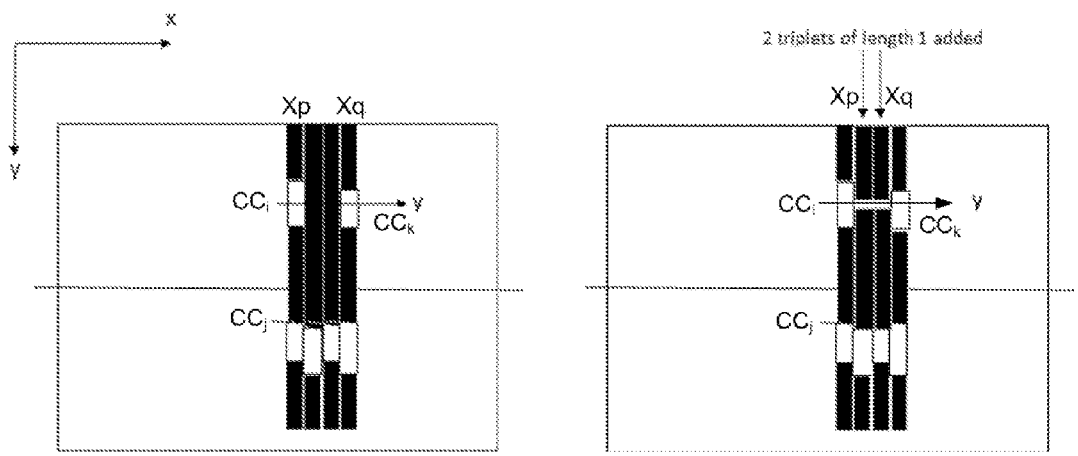
FIG. 10 illustrates the connection of two connected components in a series of connected components in the process flow of FIGS. 8a and 8b.

At step 524, the white connected components CCi and CCk are connected by adding to CCi triplets of length one from Xp+1 to Xq−1. This corresponds with triplets (Xp+1, Ym, Ym+1) up to (Xq−1, Ym, Ym−1). This is illustrated in FIG. 10. By adding these triplets of length one, CCi is also enlarged by the triplets of CCk. If no CCk is found, CCi is enlarged by adding triplets (Xp+1, Ym, Ym+1) up to (Xr, Ym, Ym+1) with r being the rightmost column of the cropped image.

After step 524, it's verified again at 518 if the rightmost triplet of the (enlarged) CCi is at the rightmost column of the cropped image.

If no, the system is again at step 520 for the connected components CCi.

If yes, the system is repeating the steps 518 to 524 for the second connected component CCj of the selected couple [CCi, CCj]. This can for example be done by verifying if both connected components CCi and CCj of the selected couple have the rightmost triplet at the rightmost column of the cropped image as illustrated at step 526 in FIG. 8b. If at step 526 the answer is no, then step 518 is started for CCj. At step 518 it's verified if the rightmost triplet of CCj is at the rightmost column of the cropped image and steps 520 to 524 are executed for CCj.

If the outcome of step 526 is yes, then two white connected components CCi and CCj are identified of which one is above and one is below the central line. In other words, process flow 500 identified the central line in the work image.

Figure 11:
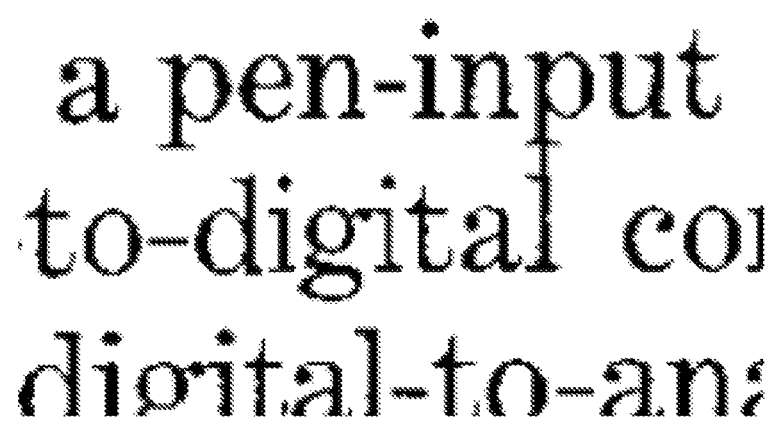

This process flow is especially useful in situations where two subsequent text lines are connected in the acquired image as illustrated in FIG. 11. In Figure 11the acquired image has a connection between the character p and the character 1. The process flow 500 will correct this and improves by that the accuracy of any OCR process on the scanned image.

Comparing the central line in the work image with the cropped binarized image, provides the location of the central line in the cropped binarized image. This results in a cropped image with only a central text line, i.e. the central text line image 118.

Figure 12:
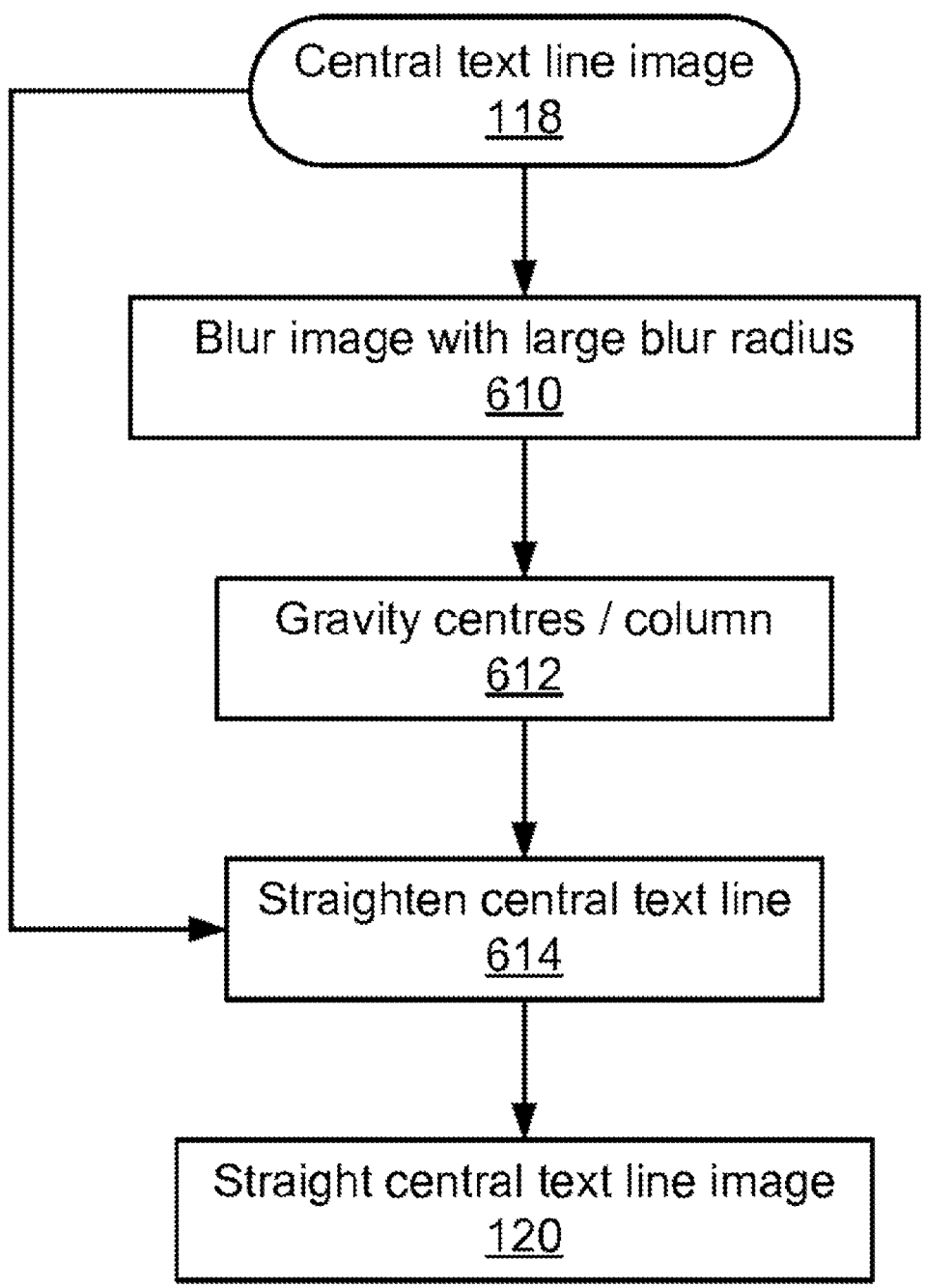
FIG. 12 illustrates a process flow for straightening a central text line.

FIG. 12 illustrates a process flow 600 corresponding to step 106 in process flow 100. Process flow 600 straightens the central text line in the central text line image 118. Alternatively, process flow 600 can be executed on the grayscale or colour central line image 224 as discussed above.

At step 610, the central text line image 118 is blurred with a large blur radius. For a black and white image, the result of blurring is a grayscale image.

At step 612, for each column, the gravity centre of the grey components in each column is determined. Connecting the gravity centres in each subsequent column creates a gravity centre line.

At step 614, the gravity centre line is used to create a straight centre line in the corresponding non-blurred central text line image 118. This can be realized by translating the columns such that the gravity centre line becomes a straight horizontal line.

In an alternative method, the gravity centre line is made straight by translating and rotating each black connected component of the text line. Each black connected component is rotated by an angle corresponding to the angle of the gravity centre line at the gravity centre of the CC middle column with respect to the desired straight horizontal line.

Figure 13:
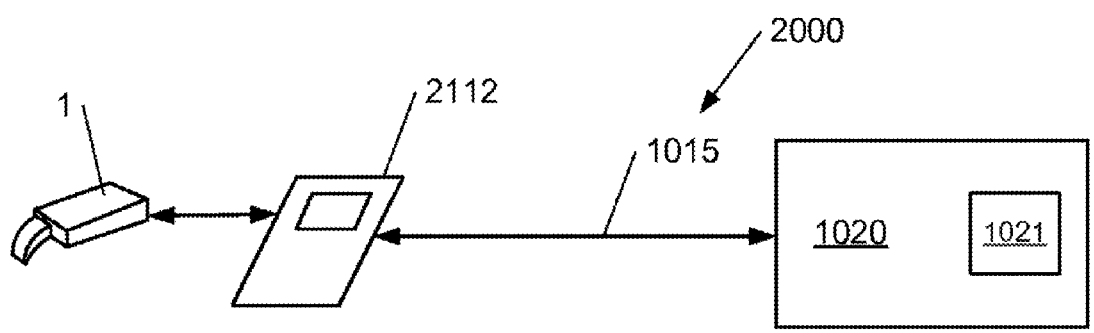
FIG. 13 illustrates an system according to an embodiment of the present invention, the system including a hand-held scanning device, a mobile device and a remote computer.

The handheld scanning device 1 of FIG. 1 can be used in many applications and configurations. FIG. 13 illustrates a system 2000 where the handheld scanning device 1 may be used in connection with a mobile device 2112 and where the mobile device may be connected to a remote computer 1020. The system 2000 comprises the hand-held scanning device 1, a mobile device 2112, a remote computer 1020, a connection between the hand-held scanning device 1 and the mobile device 2112 and a connection 1015 between the mobile device 2112 and the remote computer 1020. The hand-held scanning device 1 is able to scan a text present on a physical support (not shown) like a hardcopy document (e.g. a sheet of paper) or an object.

The hand-held scanning device 1 can be a pen scanner with an optical sensor, and the mobile device 2112 can be a multi-purpose mobile terminal such as a smart-phone or a tablet. The hand-held scanning device 1 and the mobile device 2112 are connected either by a wired or wireless connection.

The connection 1015 between the mobile device 2112 and the remote computer 1020 is preferably at least partially wireless. The connection 1015 is preferably at least partially through a cellular network connection. The connection 1015 may, at least partially, use an internet connection.

The remote computer 1020 can be a dedicated server. The remote computer 1020 may be "in the cloud" and may comprise at least one computer of a cloud computing service, a cloud computing service being a shared pool of configurable computing resources. The remote computer 1020 may also be a computer in the same building as the user of the mobile device 2112. The remote computer 1020 includes a memory 1021.

Figure 14:
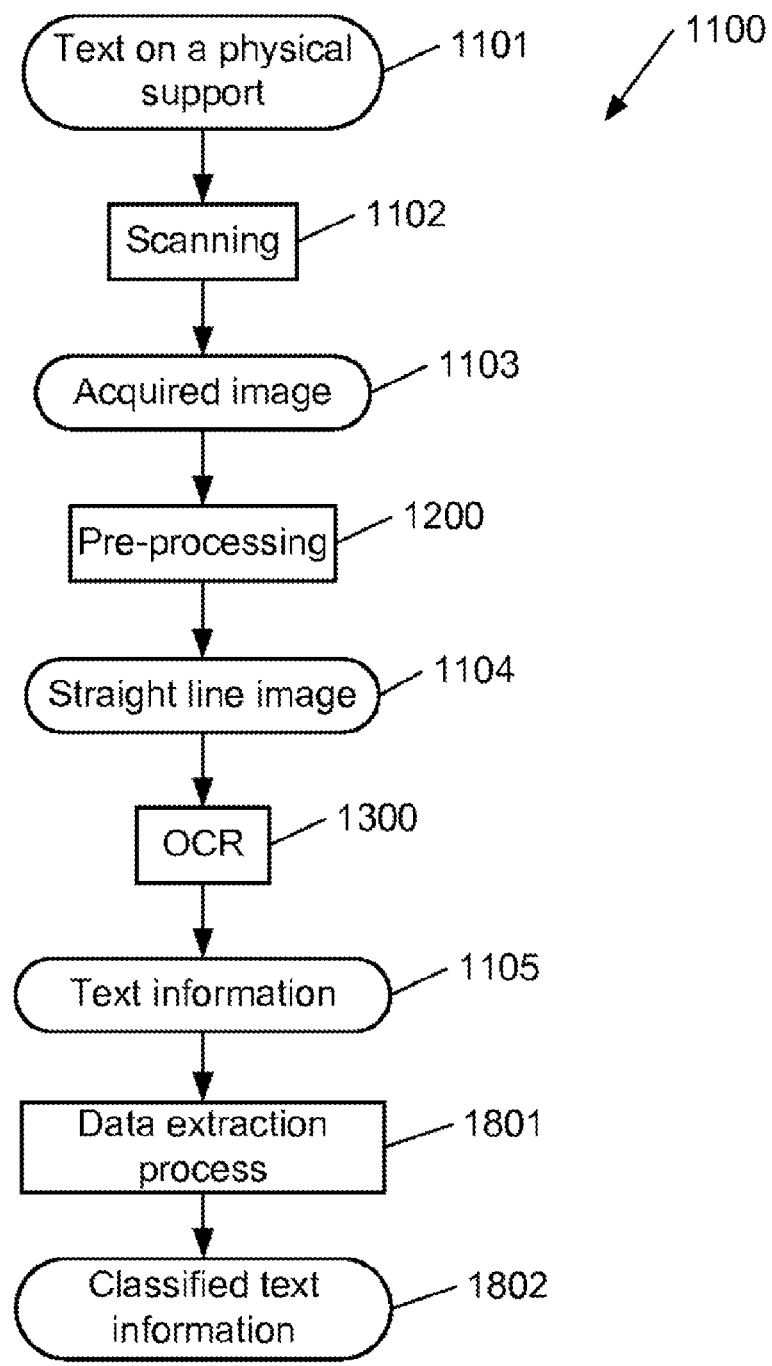
FIG. 14 shows a flowchart of an OCR process flow to obtain text information related to a text on physical support starting from said text, according to an embodiment of the present invention.

FIG. 14 shows a flowchart of a process flow 1100 to obtain text information 1105 and/or classified text information from a text on a physical support 1101. The text on the physical support 1101 is scanned by the hand-held scanning device 1. The scanning step 1102 outputs an acquired image 1103, which is a digital image. The acquired image 1103 may be a black-and-white, grayscale or colour image.

The acquired image 1103 is used as input for image pre-processing 1200 and results in at least one straight line image 1104. The image pre-processing 1200 comprises the above described distortion correction and may include further pre-processing processes. The straight line image 1104 is a black-and-white, grayscale or colour image containing a string of characters, which may comprise a line or a column of characters. The straight line image 1104 is a digital image. The characters in the straight line image 1104 are preferably in a string of characters aligned in a straight line.

The straight line image 1104 is used as input for OCR step 1300. The OCR step 1300 is a process wherein characters are identified according to one of the methods known in the art. The result of the OCR step 1300 is text information 1105. Optionally, the text information 1105 may be used in a data extraction process 1801. In a data extraction process the text information is compared with databases or tables to determine extra information about the text information such that the text information can be classified. The output of the data extraction step 1801 is classified text information 1802.

The text information 1105 preferably includes the ID (identification) of the characters of the straight line image 1104. The ID of a character is a recognition of the character in machine-readable code, in such a way that the text information 1105 includes preferably a searchable string of characters. The text information 1105 may include several possible IDs of the characters of the straight line image 1104, with optionally a probability associated with each of the possible IDs. They provide alternative solutions for the identification of a character or group of characters.

The term "character" as used herein refers to a symbol or sign used in writing like a grapheme, a logogram, an alphabetic letter, a typographical ligature, a numerical digit or a punctuation sign.

In an embodiment of the invention, scanning 1102 is performed by the hand-held scanning device 1 and the pre-processing 1200 and the OCR 1300 are performed by the remote computer 1020. This provides the advantage that no heavy and/or specific data processing has to be performed on the hand-held scanning device 1 nor on the mobile device 2112. This means that the hand-held scanning device 1 and the mobile device 2112 may therefore be inexpensive and light. In such a system, the scanned image is send to the remote computer via the mobile device. If the resulting information is needed in an application running on the mobile device, the remote computer send the result of the process back to the mobile device after pre-processing and character identification.

In another embodiment of the invention, scanning 1102 is performed by the hand-held scanning device 1, the pre-processing 1200 is performed by the mobile device 2112 and the OCR 1300 is performed by the remote computer 1020. As the OCR 1300 is the part of the process flow 1100 which requires the most computing power and memory resources, and sometimes the use of one or more databases, it may be advantageous to perform the OCR on a powerful device, such as for example in the cloud using a cloud processing service. It is possible that the mobile device 2112 connects to the memory 1021 of the remote computer 1020 to obtain data while performing the OCR 1300.

In another embodiment of the invention, scanning 1102 and pre-processing 1200 are performed by the hand-held scanning device 1 and the OCR 1300 is performed by the remote computer 1020.

In an embodiment of the invention, a user can choose which steps of the process flow 1100 are to be performed by the mobile device 2112 and which steps are to be performed by the remote computer 1020. The user may indicate his choice before the scanning step 1102, between the scanning step 1102 and the image pre-processing step 1200, or between the pre-processing step 1200 and the OCR step 1300. This choice may be communicated by the user to the system 2000 by an actuator, such as an icon, a switch or a button on the mobile device 2112 or on the hand-held scanning device 1. For example, if the user knows the language of the text to be identified, dependent on the language the user may know if the OCR can be performed with the less powerful character recognition process running on the mobile device or if the OCR could be better performed with the more powerful character recognition process running on the remote computer. In another example, the user may know if the type of characters to be scanned can be recognized by the less powerful OCR installed on the mobile device 2112 or if a more powerful OCR installed on the remote computer is needed. The user can in this examples take the decision to perform the OCR step on the mobile device or on the remote computer 1020.

In another embodiment, an application is implemented and running on the mobile device which is in charge of the processing of the application. The user selects on the mobile device the language of the text to recognize in this application. Based on this language selection, the application goes through a process flow and decides which steps are performed on the mobile device and which steps are performed on the remote computer. The application communicates with the remote computer where needed.

In some embodiments of the invention a data extraction process 1801 is performed on the text information. Independent on which device has performed the pre-processing 1200 and the OCR 1300, the data extraction process 1801 is preferably performed by the remote computer 1020 because it requires one or more significant databases and significant computing resources. The data extraction process 1801 may be performed by an intelligent data recognition (IDR) software known in the art running on the remote computer 1020. This IDR software may be used for example to enter the data of an invoice into an ERP (Enterprise Resource Planning) system.

In a preferred embodiment of the invention, if the text information 1105 is identified on the remote computer 1020, the remote computer 1020 is sending the identified text information to the mobile device 2112 and the mobile device 2112 may display the text information on a display of the mobile device 2112.

Similarly, when a data extraction process 1801 is performed on the remote computer 1020, the classified text information 1802 may be sent by the remote computer 1020 to the mobile device 2112 and the mobile device 2112 may display the classified text information on the display of the mobile device 2112.

Figure 15:
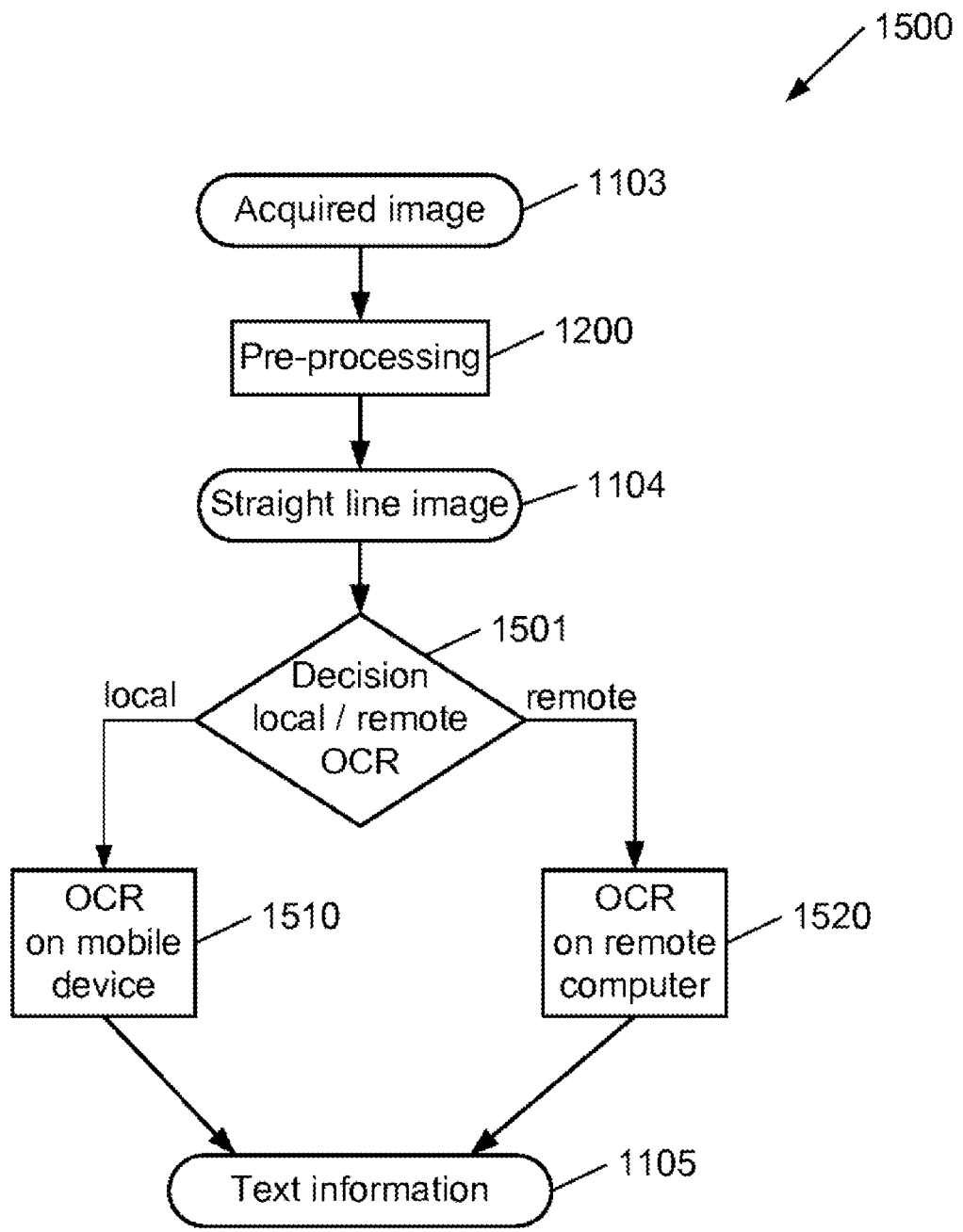
FIG. 15 shows a flowchart of an OCR process flow involving a decision step between local or remote OCR, according to an embodiment of the present invention.

FIG. 15 illustrates a process flow 1500 involving a decision step between performing OCR on the mobile device or performing OCR on the remote computer, according to an embodiment of the invention. In this embodiment, the mobile device 2112 has sufficient memory and processing power to run an OCR process which is requiring not a too large amount of processing power.

Based on the straight line image 1104 obtained after the pre-processing 1200, or based on a choice of the user, a decision 1501 is taken to perform the OCR of the straight line image 1104 locally on the mobile device 2112 (step 1510), or remotely on the remote computer 1020 (step 1520). The decision 1501 to OCR locally or remotely may depend on predetermined situations such that in a first predetermined situation, a first OCR 1510, running on the mobile device 2112, is performing the OCR step, while in a second predetermined situation, a second OCR 1520, on the remote computer 1020, is performing the OCR step. Independent on where the OCR is performed, the result of process flow 1500 is the text information 1105 as illustrated in FIG. 15.

The decision 1501 to perform local or remote OCR may be taken by the user of the mobile device 2112. The user may base his decision on the knowledge of the language to be identified, on the desire for accuracy, or on the type of document.

Alternatively, the decision 1501 to perform local or remote OCR may be automatically taken by the mobile device 2112. The mobile device 1501 may check for the existence of the connection 1015 (FIG. 13), and, if there is no connection 1015, the OCR may be performed by the mobile device 2112 if the mobile device 2112 is able to perform it. If there is a connection 1015, the mobile device may decide to perform the OCR on the remote computer.

In a preferred embodiment, the decision 1501 to perform local or remote OCR may take into account the language of the text to recognize, whereby said language may be set by the user on the mobile device 2112. For example, the user can select in an application running on the mobile device the language of the text. Based on that, the application determines if the OCR is performed on the mobile device or on the remote computer.

In a further preferred embodiment, the decision 1501 to perform local or remote OCR may involve an attempt of recognition of a type of character by the mobile device 2112. For example, the mobile device 2112 may have the software required to recognize some character types in a first character type set and to perform OCR for some character types in a second character type set, the first and second character type sets not necessarily being the same. If the mobile device 2112 does not recognize in the straight line image 1104 a character type, Latin character, for example, for which it is able to perform OCR, it sends the straight line image 104 to the remote computer 1020 so that the OCR 1520 is performed thereat, and, if the mobile device 2112 recognizes in the straight line image 1104 a character type for which it is able to perform OCR, it performs the OCR.

Alternatively, the decision 1501 to perform local or remote OCR may be based on a trade-off between speed and accuracy. If the user has indicated that the focus is on a high accuracy of the OCR, the decision 501 will be that the OCR is performed on the remote computer 1520, and if the user has indicated that the focus is on a high speed of the OCR, the decision 1501 will be that the OCR is performed on the mobile device 1510.

OCR on mobile device 1510 and OCR on remote computer 1520 may be different, with OCR on the mobile device 1510 being developed for limited processing and memory resources of the mobile device 1510, and OCR on remote computer 1520 being developed for high accuracy which requires more processing resources.

It is also possible that a decision to perform local/remote process is taken before pre-processing 1200, possibly based on the acquired image 1103. In this case, the pre-processing 1200 and OCR 1300 are both performed either on the mobile device 2112 or on the remote computer 1020.

The decision 1501 process opens many opportunities to optimize the scanning and OCR process. For example, if a user has to scan and recognize alternately pieces of texts in Arabic numbers and pieces of texts in Asian characters, the OCR for Arabic numbers can be installed and performed on the mobile device 1510, because OCR of Arabic numbers can be performed by a less memory and computing resources requiring OCR process, while the OCR for Asian characters can be performed by an OCR process on the remote computer 1020, because OCR processes for Asian characters typically require much more resources and memory. If the user wants to switch between local and remote OCR, it is also possible, with the option that this decision is taken automatically.

Figure 16:
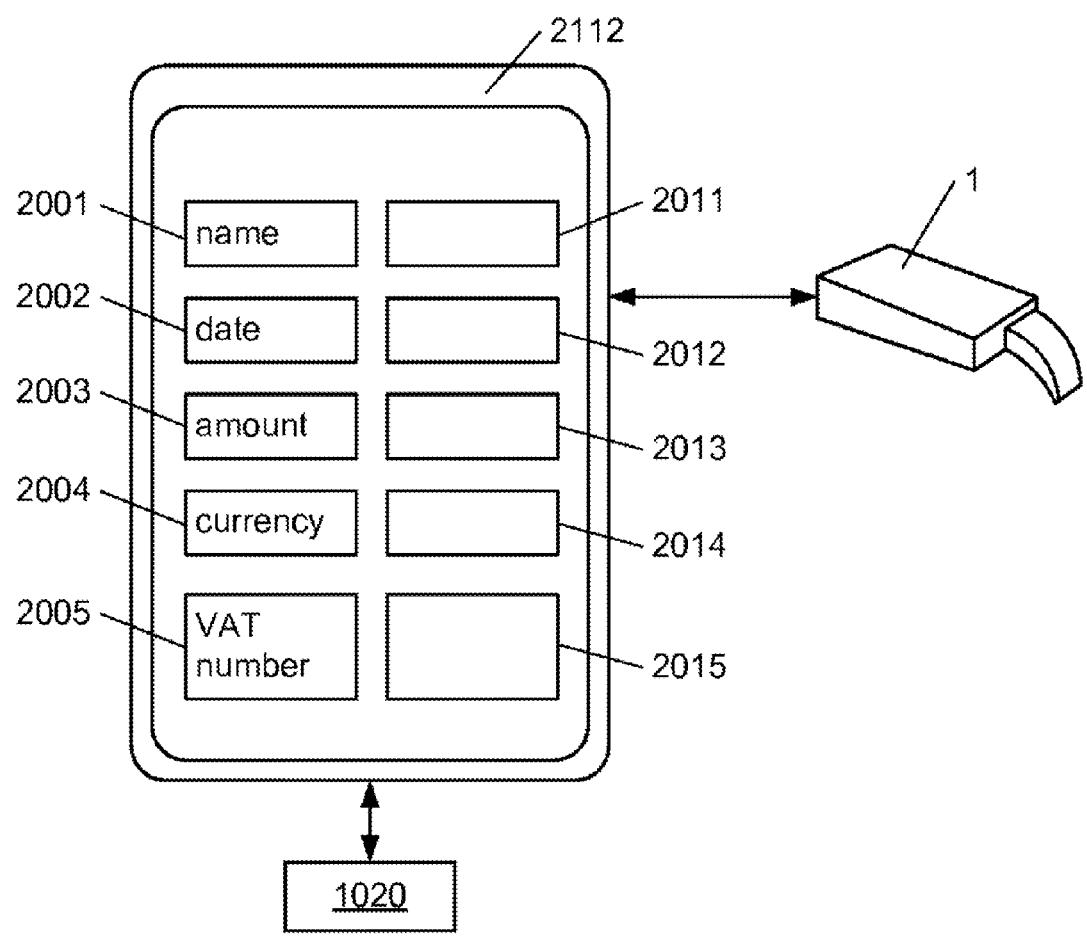
FIG. 16 illustrates the system including a hand-held scanning device, a mobile device and a remote computer according to an embodiment of the invention, with an intelligent data recognition application for invoices running on the mobile device.
Figure 17:
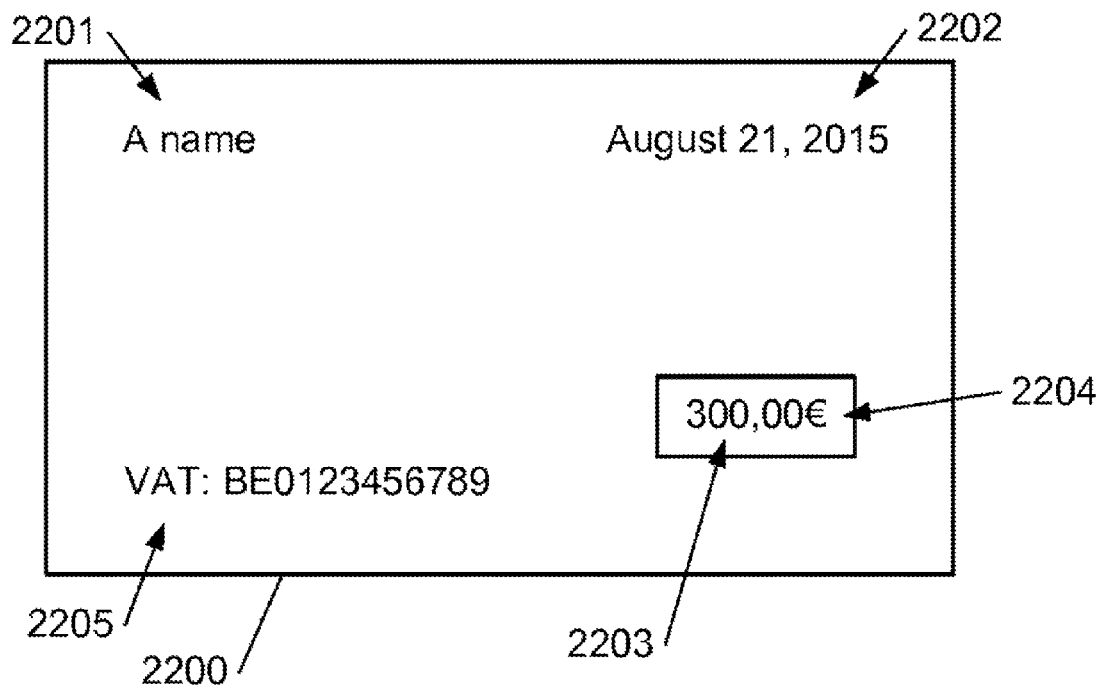
FIG. 17 illustrates an invoice that provides information to enter in the intelligent data recognition application, according to an embodiment of the invention.
Figure 18:
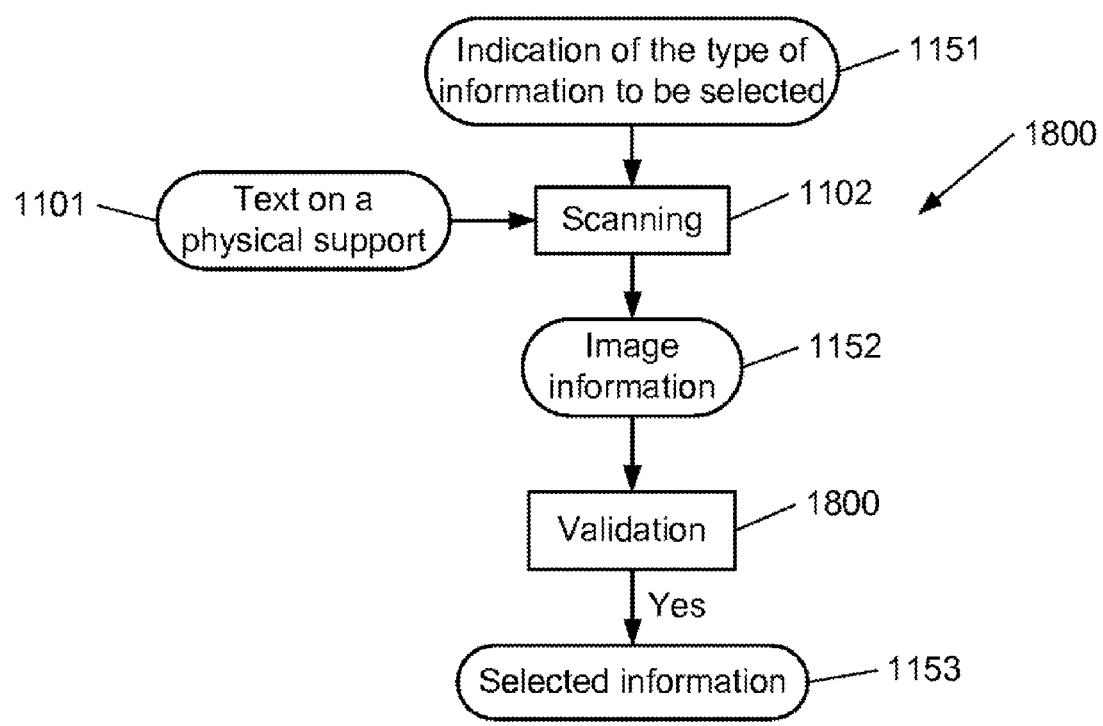
FIG. 18 shows a flowchart of a process flow to select information from a text on a physical support, according to an embodiment of the invention.

FIGS. 16 and 17 illustrate how the hand held scanning device 1 may be used to select information in a hardcopy document like an invoice 2200. For example, it can be used for entering the data of an invoice into an ERP system FIGS. 16 and 17 are described in parallel with FIG. 18 illustrating a corresponding process flow 1800 to select information on a physical document or an object.

The mobile device 2112 runs an application, for example an APP for IDR, preferably linked to an IDR software running on the remote computer 1020. The mobile device 2112 displays a plurality of parameters to be entered in the IDR APP for the IDR of the invoice 2200, namely a name 2001 of the document, a date 2002, an amount 2003, a currency 2004 and a VTA number 2005. The APP interface also displays empty fields 2011, 2012, 2013, 2014, 2015 to be filled with these parameters.

The APP interface gives an indication of the type of information to be selected 1151, for example by displaying a bar in the empty field 2011 for the name, by highlighting the field to be selected or any other indication. The type of information can be a name (e.g. provider name), a date, an amount, a currency, a VAT number, an email address, a street address, a bank account or any string of characters, . . . .

The user then takes the hand-held scanning device 1, selects on the invoice 2200 the position of the text (here the name 2201) corresponding to the type of information to be selected and scans it (step 1102). The hand-held scanning device 1 performs the scanning (step 1102), which generates an image information 1152. The image information 1152 is preferably the acquired image 1110 described above.

The image information 1152 is used as input for a validation 1900. If the validation 1900 is performed on the remote computer 1020, the image information 1152 is sent from the hand held scanning device 1, via the mobile device 2112, to the remote computer 1020.

Figure 19:
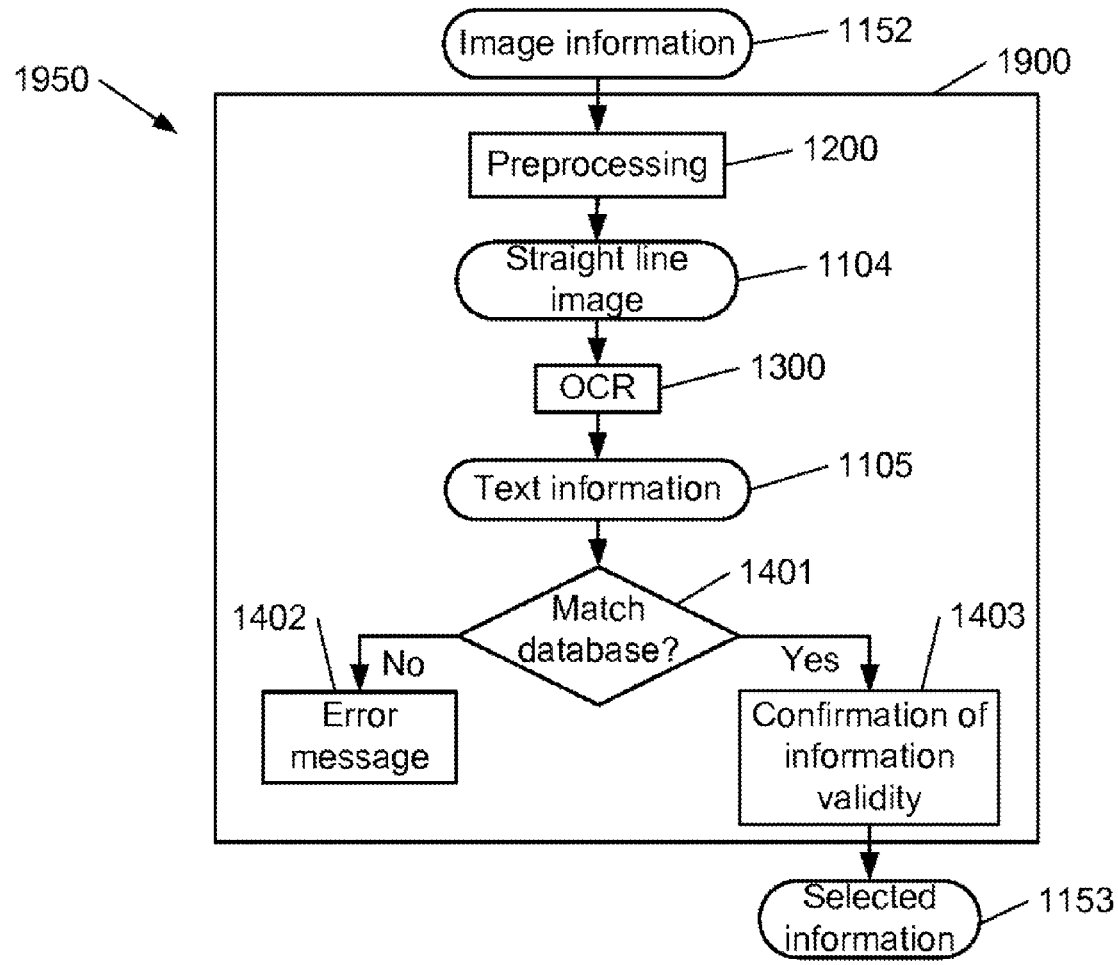
FIG. 19 shows a flowchart of a process flow for validation of information, according to an embodiment of the invention.

A possible process flow 1950 for the validation 1900 is illustrated at FIG. 19. The validation 1900 is a verification that the image information 1152 corresponds to what is expected for the type of information that was requested by the indication of the type of information to be selected 1151.

The validation 1900 can include one or several of the following steps:
an image comparison,
a check that the image information 1152 includes a string of characters,
a counting of the number of characters,
a check that the characters include a given type of character, for example a @ for an email address,
a check that the characters represents a date,
a check that the characters are
numbers,
letters,
a string of a predetermined number of characters,
a string with numbers and letters at predetermined places,
one kind of string amongst several kinds of strings,
a string which matches a regular expression.

For example, for a VAT number, the validation 1900 can check that the image information 1152 contains two letters and at least a number of digits. Furthermore, the validation 1900 could check if these two letters correspond to a country code and possibly that the number of digits correspond to the number of digits expected for a VAT number of this country.

For example, for a date, the validation 1900 can check that the format is one of the typical formats for a date, including a day number, a month number or name, and a year number.

For example, for an amount, the validation 1900 can check that the image information 1152 contains a number.

For example, for a currency, the validation 1900 can check that the image information 1152 includes a currency symbol or a currency abbreviation.

Easy validation 1900 such as verifying the number of characters can be performed on the mobile device. More complex validation 1900 however may preferably be performed on the remote computer 1020. If the validation 1900 indicates that the image information 1152 corresponds to the type of information that was requested by the indication of the type of information to be selected 1151, the image information 1152 is validated and provides selected information 1153. The selected information 1153 is sent to the IDR APP on the mobile device 2112 and displayed in the corresponding field on the display of the mobile device. For example, on the field 2011 for the name of the invoice 2200, the validation may be limited to verifying the type of characters which may be performed on the mobile device. For the field 2015 however, for which a VAT number is to be selected, the validation 1900 may be performed on the remote computer to be able to verify if the scanned information is corresponding to one of a list of valid VAT numbers in a table or database on the remote computer. Alternatively, instead of sending the information back from the remoter computer to the mobile device, a message indicating that the image information 1152 is validated may be sent from the remote computer 1020 to the mobile device 2112.

The selected information 1153 may include the image information 1152, for example if this image information 1152 is a digital image.

The validation 1900 can include an OCR process 1300 and/or a data extraction (IDR) process 1801 (shown on FIG. 14). If the validation 1900 includes an OCR 1300, the selected information 1153 preferably includes the text information 1105 generated by the OCR 1300. If the validation 1900 includes an IDR, the IDR is preferably performed by the remote computer 1020.

Once a field is completed in the APP, the APP interface provides an indication of the next type of information to be selected (step 1151), which can be the date 2002 of the invoice, that the user can select and scan at the position 2202 of the invoice. The process flow 1800 can be performed for all the fields 2011-2015 of the APP interface, which correspond to texts 2201-2205 on the invoice 2200. If the process flow 1800 does not work or if the image information 1152 is not validated at step 1900, the APP interface can display an error message, for example asking the user to manually enter the information to be selected. Once the process has been performed for all the fields, the user can trigger a transmission of the invoice data to the ERP system.

With the process flow 1800 described above for selecting information, there is no need to scan a full document and to process the full information with OCR and IDR to determine a predetermined type of information such as for example date, amount, VAT number and many other types of information. Furthermore, the validation of the information verifies the type of information selected by the pen scanner reducing possible mistakes significantly.

FIG. 19 illustrates the process flow 1950 for the validation 1900 according to an embodiment of the invention. The validation 1900 includes the pre-processing 1200 and the OCR 1300 as described with reference to FIG. 14.

The pre-processing 1200 can be performed on the hand-held scanning device 1, the mobile device 2112 or the remote computer 2010 as described above. The OCR 1300 can be performed on the mobile device 2112 or the remote computer 2010 as described above. If the OCR 1300 is not performed by the remote computer 2010, the text information 1105 is sent to the remote computer to be used as input for a check 1401 with a database present on the memory 1021 (shown on FIG. 13).

In the process flow 1950 for the validation 1900, the text information 1105 preferably includes all the possible IDs of the characters of the straight line image 1104 determined during the OCR 1300, with the probability associated with each of them.

The check 1401 can be performed by an IDR software running on the remote computer 2010 and connected to the IDR APP running on the mobile device 2112. The check 1401 with a database compares the text information 1105 with strings of characters contained in a database. The check 1401 starts preferably by looking for a match between a string of character in the database and the most probable ID of characters in the IDs of the text information 1105. If there is no match, a fuzzy search can be performed to find, amongst all the IDs of the characters included in the text information 1105, an ID that matches a string of character present in the database. This ID is then considered as the selected information 1153.

For example, if the field corresponding to the indication of the type of information to be selected 1151 is "name of invoice provider", the identification with the highest probability in the text information 1105 is Lowson and the database includes a list of providers which does not include Lowson but does include Lawson, the fuzzy search is able to find the name Lawson and returns a "match".

If there is a match between the text information 1105 and a string of character, the validity of the image information 1152 is confirmed 1403. This confirmation is sent to the mobile device 2112. The text information 1105 is then preferably provided to the mobile device 2112, if it does not have it yet, and displayed by the IDR APP interface.

If the database contains additional information corresponding to the text information 1105, this additional information can also be outputted and sent to the mobile device 2112 or used for further processing, for example in IDR, on the remote computer 1020. For example, the database can include a list of VAT numbers and matches VAT numbers and provider names. If the text information 1105 includes a VAT number of the list, the name of the corresponding provider can be outputted.

If there is no match, an error message 402 is returned, sent to the mobile device 2112 and displayed on the mobile device 2112. Such an error message may be, for example, to ask the user to scan the text on the physical support 1101 again or to ask the user to perform a manual entry of the text shown on the physical support 1101.

What is claimed is:

1. A computer-implemented method implemented on a mobile device for selecting information on a physical document or object, the method being stored in a memory of the mobile device comprising a processor for performing the method, the mobile device being connectable to a hand-held pen scanning device, the method comprising
    providing the mobile device an interface to the user, the interface comprising an indication of a type of information to be selected;
    receiving, by the processor in the mobile device, information from the hand-held pen scanning device connected to the mobile device;
    determining, by the processor in the mobile device, if the received information is valid information for the type of information to be selected; and
    identifying, by the processor in the mobile device, the received information as selected information if the received information is valid.

2. The method according to claim 1, wherein the step of determining, by the processor in the mobile device, if the received information is valid information comprises
    sending, by the processor in the mobile device, the received information to a connected remote computer for comparing the received information with a database of valid information;
    receiving, by the processor in the mobile device, feedback information with respect to the received information from the remote computer wherein the feedback information is one of valid indicating that the received information is corresponding with valid information in the database or invalid indicating that the received information is not corresponding to valid information in the database.

3. The method according to claim 1, wherein the step of determining, by the processor in the mobile device, if the received information is valid information comprises:
    performing, by the processor in the mobile device, a validation check on the mobile device when the type of information is a first type of information; and
    sending, by the processor in the mobile device, the received information to a remote computer for a validation check if the type of information is a second type of information.

4. The method according to claim 3, wherein the first type of information is information to be verified on the format of the information and wherein the second type of information is information to be verified on the content of the information.

5. The method according to claim 1, wherein the connection between the mobile device and the pen scanning device is wireless.

6. The method according to claim 3, wherein the step of determining, by the processor in the mobile device, if the received information is valid information comprises applying, by the processor in the mobile device, a character identification process on the received information to become text information.

7. The method according to claim 6, wherein the step of determining, by the processor in the mobile device, if the received information is valid information comprises pre-processing, by the processor in the mobile device, the received information to become a straight line image.

8. The method according to claim 1, wherein the interface comprises fields of a first type and a second type, and wherein the step of determining, by the processor in the mobile device, if the received information is valid information comprises:
    performing, by the processor in the mobile device, a validation check when the field is a field of the first type; and
    sending, by the processor in the mobile device, the received information to a remote computer for a validation check if the field is a field of the second type.

9. A computer-implemented method for determining information in an application stored in a memory of a mobile device using a hand-held scanning device for capturing information, the hand-held scanning device being connectable to the mobile device and the mobile device is connectable to a remote computer comprising a memory and a processor, the method comprising
    receiving, by the mobile device an acquired image from the hand-held scanning device,
    pre-processing, by the processor in the mobile device, the acquired image to become a pre-processed image;
    applying a character recognition process on the pre-processed image to identify characters in the pre-processed image, wherein in a first predetermined situation a first character recognition process stored in the memory of the mobile device is applied, by the processor in the mobile device, to the pre-processed image and in a second predetermined situation a second character recognition process stored in the memory of a remote computer is applied, by the processor in the remote computer, to the pre-processed image.

10. The method according to claim 9, wherein the hand-held scanning device is a hand-held pen scanning device.

11. The method according to claim 10, wherein the pre-processing step comprises correcting, by the processor in the mobile device, distortion in the acquired image.

12. The method according to claim 11, wherein the step of correcting distortion comprises correcting, by the processor in the mobile device, distortion due to instantaneous change of speed of the hand-held pen scanning device with respect to the scanned object and correcting, by the processor in the mobile device, distortion due to instantaneous change of scanning direction with respect to the scanned object.

13. The method according to claim 9, wherein the hand-held scanning device is wirelessly connectable to the mobile device.

14. The method according to claim 9, wherein the application is an invoice processing application comprising fields, and wherein a first type of fields activates the first predetermined situation for applying, by the processor in the mobile device, the first character recognition process and a second type of fields activates the second predetermined situation for applying, by the processor in the mobile device, the second character recognition process.

15. The method according to claim 9, wherein a first language activates the first predetermined situation for applying, by the processor in the mobile device, the first character recognition process and a second language activates the second predetermined situation for applying, by the processor in the mobile device, the second character recognition process.

16. The method according to claim 9, wherein a first accuracy parameter activates the first predetermined situation for applying, by the processor in the mobile device, the first character recognition process and a second accuracy parameter activates the second predetermined situation for applying, by the processor in the mobile device, the second character recognition process.

17. A method for entering information in an application stored in a memory of a mobile device comprising a processor, wherein the method uses a mobile scanning device for capturing the information, the mobile scanning device being connected to the mobile device and the mobile device is connected to a remote computer, the method comprising receiving, by the mobile device, an image from the mobile scanning device, pre-processing, by the processor in the mobile device, the image to become a pre-processed image;

sending, by the processor in the mobile device, information based on the pre-processed image to a remote computer which is configured for applying a data extraction process on the information, receiving, by the processor in the mobile device, classified text information from the remote computer to use in the application on the mobile device.

18. The method according to claim 17, further comprising the step of applying, by the processor in the mobile device, a character recognition process on the pre-processed image, and wherein the information based on the pre-processed image is text information resulting from the character recognition process.

19. The method according to claim 17, wherein the hand-held scanning device is a hand-held pen scanning device wirelessly connected with the mobile device.

20. The method according to claim 17, wherein the application is an invoice processing application containing fields to be completed with classified text information, and wherein the classified text information is one of VAT number, company name, or company address.

* * * * *